US 12,134,877 B2
Nov. 5, 2024

(12) United States Patent
Fukuda et al.

(54) WORKING MACHINE

(71) Applicant: KUBOTA CORPORATION, Osaka (JP)

(72) Inventors: Yuji Fukuda, Osaka (JP); Kohei Nagao, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/530,964

(22) Filed: Dec. 6, 2023

(65) Prior Publication Data

US 2024/0102265 A1 Mar. 28, 2024

Related U.S. Application Data

(63) Continuation of application No. 17/388,668, filed on Jul. 29, 2021, now Pat. No. 11,873,624.

(30) Foreign Application Priority Data

Aug. 15, 2020 (JP) .................................. 2020-137169
Mar. 18, 2021 (JP) .................................. 2021-045017

(51) Int. Cl.
 *E02F 9/22* (2006.01)
 *B62D 11/00* (2006.01)
 *B62D 11/04* (2006.01)
 *F15B 15/00* (2006.01)
 *F15B 18/00* (2006.01)

(52) U.S. Cl.
 CPC .......... *E02F 9/2253* (2013.01); *B62D 11/005* (2013.01); *B62D 11/04* (2013.01); *E02F 9/2235* (2013.01); *E02F 9/225* (2013.01);

*E02F 9/2275* (2013.01); *F15B 15/00* (2013.01); *F15B 18/00* (2013.01); *E02F 9/2285* (2013.01);
(Continued)

(58) Field of Classification Search
 CPC ....... E02F 9/2253; F16H 61/462; F16H 61/47
 See application file for complete search history.

(56) References Cited

U.S. PATENT DOCUMENTS 5,660,041 A 8/1997 Hartung
11,124,948 B2 9/2021 Fukuda
(Continued)

FOREIGN PATENT DOCUMENTS

JP 2017-179923 A 10/2017

*Primary Examiner* — Michael Leslie
(74) *Attorney, Agent, or Firm* — Greenblum & Bernstein, P.L.C.

(57) ABSTRACT

A working machine includes a machine body, a left traveling device located left on the machine body, a right traveling device located right on the machine body, and a controller configured or programmed to perform automatic deceleration to automatically reduce a first rotation speed of a left traveling motor and a second rotation speed of a right traveling motor by shifting a speed stage of each of the left and right traveling motors from a second speed stage to a first speed stage that is lower than the second speed stage. The controller is configured or programmed to: not perform the automatic deceleration when the first rotation speed or the second rotation speed is equal to or higher than a predetermined rotation speed; and perform the automatic deceleration when the first rotation speed and the second rotation speed are less than the predetermined rotation speed.

8 Claims, 11 Drawing Sheets

(52) U.S. Cl.
CPC .......... *E02F 9/2292* (2013.01); *E02F 9/2296* (2013.01); *F15B 2211/57* (2013.01)

(56) References Cited

U.S. PATENT DOCUMENTS

| | | | |
|---|---|---|---|
| 11,846,087 B2 * | 12/2023 | Fukuda | .................... B62D 1/04 |
| 11,873,624 B2 * | 1/2024 | Fukuda | ................ E02F 9/2235 |
| 11,946,227 B2 * | 4/2024 | Nagao | .................... F16H 61/47 |
| 12,065,191 B2 * | 8/2024 | Fukuda | ................ E02F 9/2289 |
| 2022/0049458 A1 | 2/2022 | Nagao | |
| 2022/0049460 A1 | 2/2022 | Fukuda | |
| 2022/0049468 A1 | 2/2022 | Fukuda | |
| 2022/0049469 A1 | 2/2022 | Fukuda | |
| 2022/0259826 A1 | 8/2022 | Nagao | |

* cited by examiner

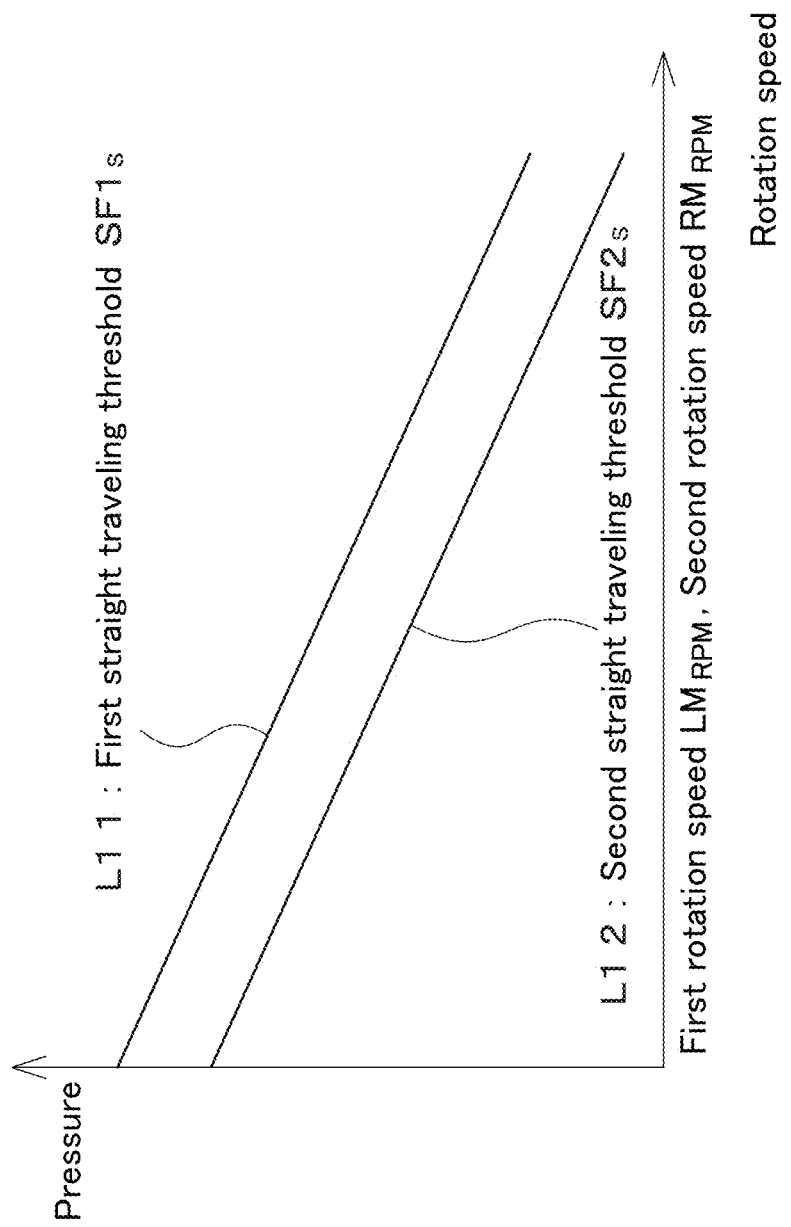

WORKING MACHINE

CROSS-REFERENCE TO RELATED APPLICATIONS

This application is a continuation of U.S. application Ser. No. 17/388,688 filed on Jul. 29, 2021, which claims the benefit of priority to Japanese Patent Application No. 2020-137169 filed on Aug. 15, 2020 and to Japanese Patent Application No. 2021-045017 filed on Mar. 18, 2021. The entire contents of each of these applications are hereby incorporated herein by reference.

BACKGROUND OF THE INVENTION

1. Field of the Invention

The present invention relates to a working machine such as a skid steer loader, a compact track loader, and a backhoe.

2. Description of the Related Art

Japanese unexamined patent application publication No. 2017-179923 discloses a technique for decelerating and accelerating a working machine. The working machine described in Japanese unexamined patent application publication No. 2017-179923 has a prime mover including an engine, a hydraulic pump configured to be operated by power of the prime mover and to output an operation fluid, a traveling hydraulic device configured to switch a speed between a first speed and a second speed that is faster than the first speed according to a pressure of the operation fluid, an operation valve configured to change the pressure of the operation fluid applied to the traveling hydraulic device, and a measurement device configured to detect the pressure of the operation fluid. When a detected pressure, which is a pressure of the operation fluid detected by the measurement device, drops from a set pressure corresponding to the second speed to a predetermined pressure or lower, the operation valve reduces the pressure of the operation fluid applied to the traveling hydraulic device to decelerate the traveling hydraulic device to the first speed.

SUMMARY OF THE INVENTION

The working machine of Japanese unexamined patent application publication No. 2017-179923 is capable of automatically decelerating from a second speed to a first speed when a pressure of an operation fluid in traveling to be supplied to a traveling device is equal to or higher than a predetermined pressure. However, due to a traveling state (that is, spin turn, pivot turn, straight traveling) of the working machine (that is, a traveling device), the deceleration may be caused unexpectedly.

The present invention is provided to solve the above-mentioned problems of the conventional technique, and is intended to provide a working machine capable of smoothly decelerating according to the traveling state of the working machine.

Technical means of the present invention for solving this technical problem is characterized by the following points.

A working machine includes a machine body, a left traveling device located left on the machine body, a right traveling device located right on the machine body, a left traveling motor to output a power to the left traveling device, a right traveling motor to output a power to the right traveling device, a first rotation detector to detect a first rotation speed that is a rotation speed of the left traveling motor, a second rotation detector to detect a second rotation speed that is a rotation speed of the right traveling motor, a left traveling pump to supply operation fluid to the left traveling motor, a right traveling pump to supply operation fluid to the right traveling motor, a traveling operation device to operate at least one of the left traveling pump or the right traveling pump, and a controller configured or programmed to perform automatic deceleration to automatically reduce the first rotation speed and the second rotation speed by shifting a speed stage of each of the left and right traveling motors from a second speed stage to a first speed stage that is lower than the second speed stage. The controller is configured or programmed to not perform the automatic deceleration when the first rotation speed or the second rotation speed is equal to or higher than a predetermined rotation speed and perform the automatic deceleration when the first rotation speed and the second rotation speed are less than the predetermined rotation speed.

The working machine further includes a hydraulic pump to deliver pilot fluid and traveling fluid lines connected to pressure receiver portions of the left traveling pump and the right traveling pump. The traveling operation device is configured to be operated to change each of angles of swash plates of the left traveling pump and the right traveling pump, respectively, and to change pilot pressure to be outputted to each of the traveling fluid lines according to operation of the traveling operation device, the pilot pressure being a pressure of the pilot fluid. The controller is configured or programmed to judge a behavior of the machine body based on the pilot pressure at each of the traveling fluid lines, and, if determining that the behavior of the machine body is a left pivot turn or a right pivot turn, perform the automatic deceleration.

The working machine further includes a hydraulic pump to deliver pilot fluid and traveling fluid lines connected to pressure receiver portions of the left traveling pump and the right traveling pump. The traveling operation device is configured to be operated to change each of angles of swash plates of the left traveling pump and the right traveling pump, respectively, and to change pilot pressure to be outputted to each of the traveling fluid lines according to operation of the traveling operation device, the pilot pressure being a pressure of the pilot fluid. The controller is configured or programmed to judge a behavior of the machine body based on the pilot pressure at each of the traveling fluid lines, and, if determining that the behavior of the machine body is a left spin turn or a right spin turn, perform the automatic deceleration.

The working machine further includes a hydraulic pump to deliver pilot fluid and traveling fluid lines connected to pressure receiver portions of the left traveling pump and the right traveling pump. The traveling operation device includes: a traveling operation member to be swung; and operation valves to be actuated according to a manner in which the traveling operation member is swung and change pilot pressure outputted to each of the traveling fluid lines, the pilot pressure being a pressure of the pilot fluid. The pilot pressure which acts on one or more of the pressure receiver portions of the left traveling pump and the right traveling pump from the respective traveling fluid lines changes, so that one or more of the angles of swash plates of the left traveling pump and the right traveling pump are changed and one or more of rotation directions and/or one or more of rotation speeds of the left traveling motor and the right traveling motor change.

The working machine, wherein the traveling operation device includes high-pressure selector valves each connected to a corresponding one of the traveling fluid lines and each connected to two of the operation valves; and each of the high-pressure selector valves is configured to output, to the corresponding one of the traveling fluid lines, a higher one of pilot pressures outputted from the two of the operation valves.

The controller is configured or programmed to: not perform the automatic deceleration when the traveling operation device is operated in a direction to make the machine body to travel forward and the left traveling motor and the right traveling motor are rotating in a direction corresponding to backward traveling of the machine body; and perform the automatic deceleration when the traveling operation device is operated in a direction to make the machine body to travel forward and the left traveling motor and the right traveling motor are rotating in a direction corresponding to forward traveling of the machine body.

The working machine further includes a first circulation fluid line connecting the left traveling pump to the left traveling motor, a second circulation fluid line connecting the right traveling pump to the right traveling motor, a first pressure detector provided on a portion of the first circulation fluid line connected to a first port of the left traveling motor and configured to detect a first traveling pressure that is a pressure of operation fluid flowing in the portion of the first circulation fluid line connected to the first port during rotation of the left traveling motor, a second pressure detector provided on a portion of the first circulation fluid line connected to a second port of the left traveling motor and configured to detect a second traveling pressure that is a pressure of operation fluid flowing in the portion of the first circulation fluid line connected to the second port during rotation of the left traveling motor, a third pressure detector provided on a portion of the second circulation fluid line connected to a third port of the right traveling motor and configured to detect a third traveling pressure that is a pressure of operation fluid flowing in the portion of the second circulation fluid line connected to the third port during rotation of the right traveling motor, and a fourth pressure detector provided on a portion of the second circulation fluid line connected to a fourth port of the right traveling motor and configured to detect a fourth traveling pressure that is a pressure of operation fluid flowing in the portion of the second circulation fluid line connected to the fourth port during rotation of the right traveling motor. The controller is configured or programmed to determine whether or not to perform the automatic deceleration based on (i) at least one of the first traveling pressure, the second traveling pressure, the third traveling pressure, or the fourth traveling pressure and (ii) at least one predetermined threshold.

The controller is configured or programmed to increase the at least one predetermined threshold as the first rotation speed or the second rotation speed increases.

According to the present invention, deceleration can be performed smoothly according to a traveling state of the working machine.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 7 is a view showing a relationship between the first rotation speed $LM_{RPM}$, a second rotation speed $RM_{RPM}$, the first straight threshold $SF1_S$, the second straight threshold $SF2_S$.

DETAILED DESCRIPTION OF THE PREFERRED EMBODIMENTS

Figure 1:
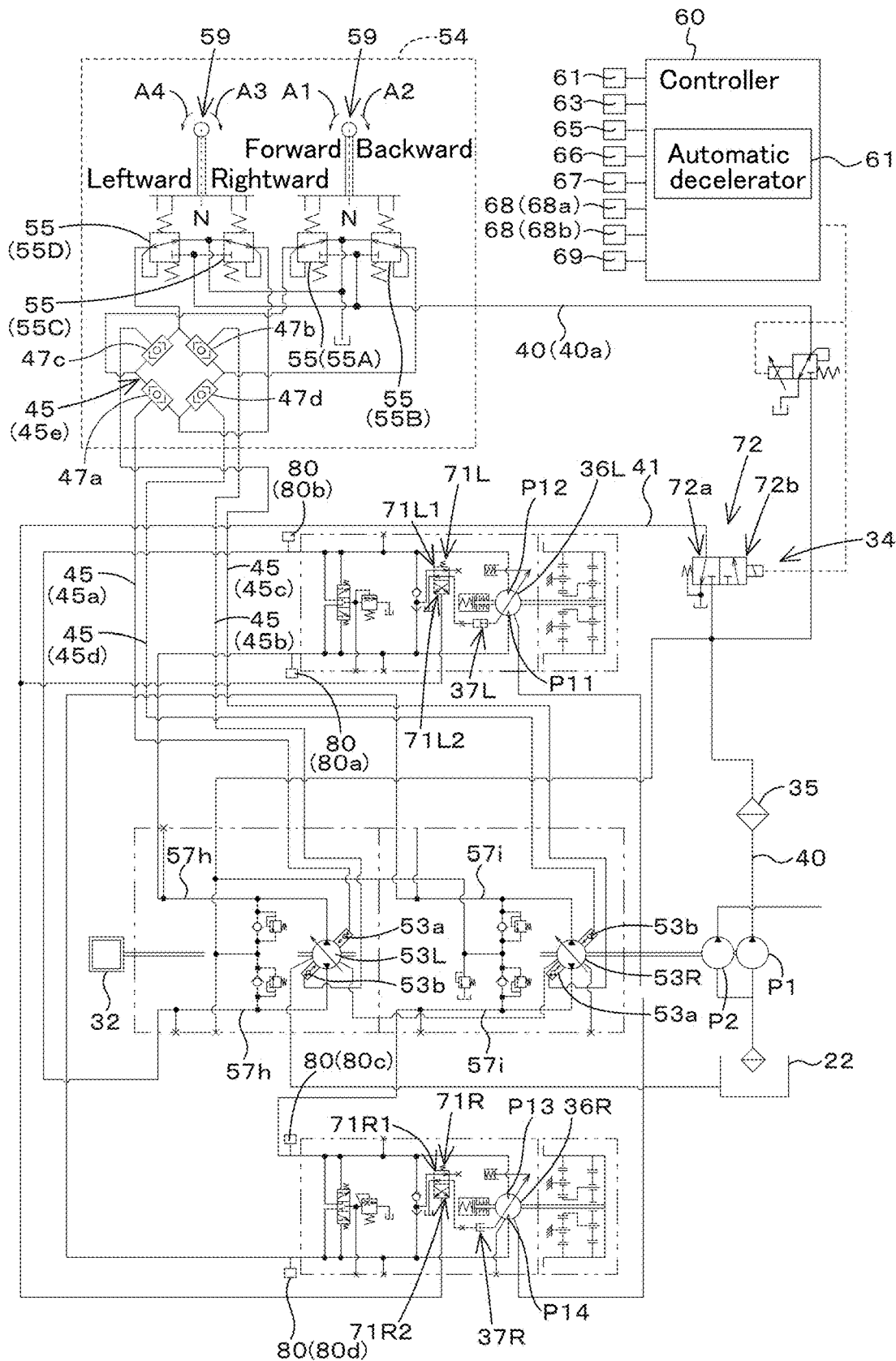
FIG. 1 is a view showing a hydraulic system (a hydraulic circuit) for working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

With reference to drawings as appropriate, a preferred embodiment of a hydraulic system for a working machine and the working machine having the hydraulic system will be described below.

Figure 9:
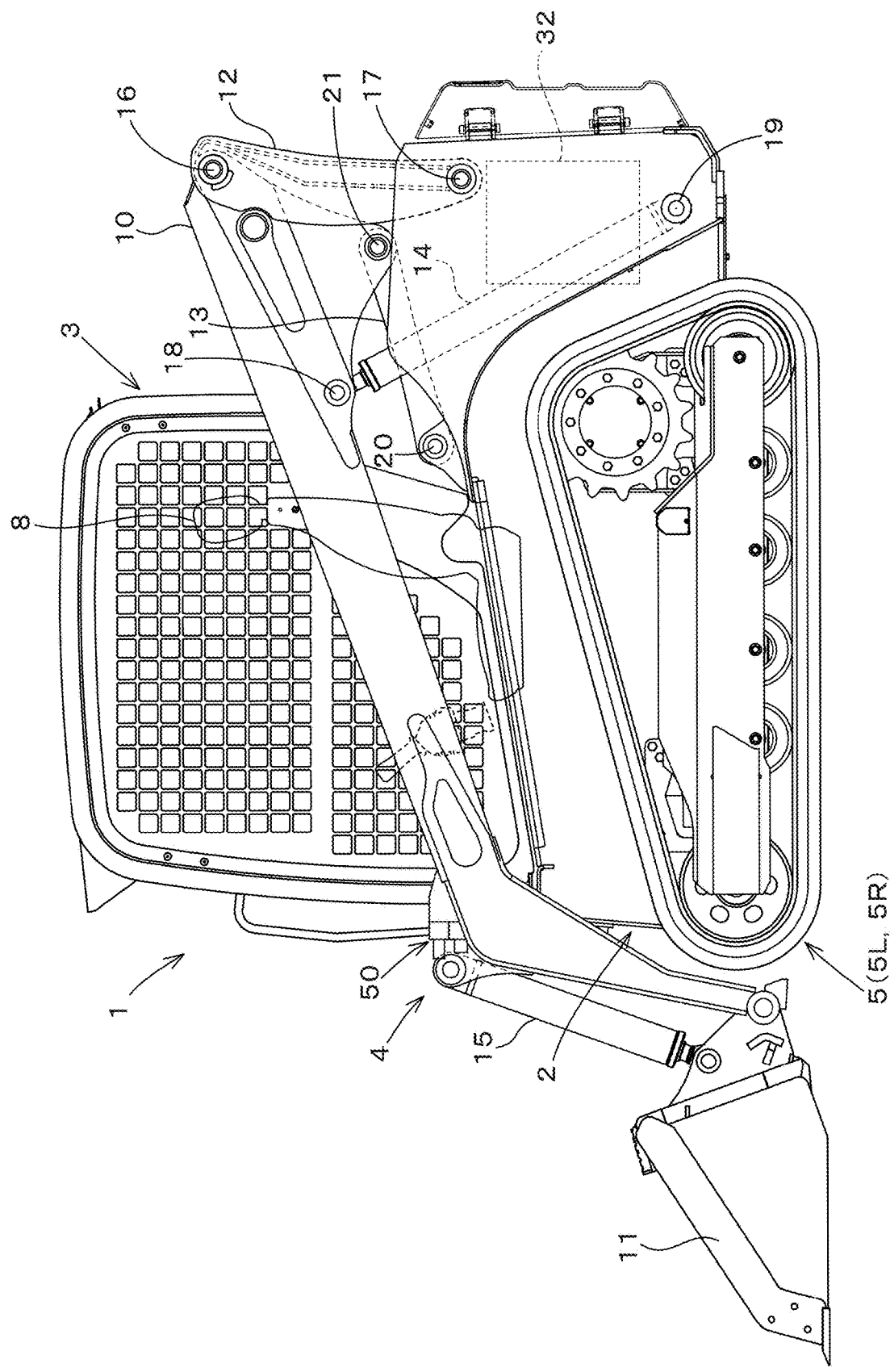
FIG. 9 is a side view showing a track loader that is an example of a working machine.

FIG. 9 shows a side view of a working machine of the present invention. FIG. 9 shows a compact track loader as an example of the working machine. However, the working machine of the present invention is not limited to the compact track loader, but may be other types of loader working machines, such as a skid steer loader, for example. In addition, the working machine may be a working machine other than the loader working machine.

As shown in FIG. 9, a working machine 1 has a machine body 2, a cabin 3, a working device 4, and a pair of traveling devices 5L and 5R. In the embodiment of the present invention, a forward direction of a driver siting on a driver seat 8 of the working machine 1 (a left side in FIG. 9) is referred to as the front, a rearward direction of the driver (a right side in FIG. 9) is referred to as the rear, a leftward direction of the driver (a front surface side of FIG. 9) is referred to as the left, and a rightward direction of the driver (a back surface side of FIG. 9) is referred to as the right. A horizontal direction, which is orthogonal to a fore-and-aft direction, is referred to as a machine width direction. A direction from the center of the machine body 2 to the right or left is referred to as a machine outward direction. In other words, the machine outward direction is the machine width direction and separates away from the machine body 2. A direction opposite to the machine outward direction is referred to as a machine inward direction. In other words, the machine inward direction is the machine width direction and approaches the machine body 2.

The cabin 3 is mounted on the machine body 2. The cabin 3 incorporates the driver seat 8. The working device 4 is attached to the machine body 2. A pair of traveling devices 5L and 5R are arranged on the outside of the machine body 2. A prime mover 32 is mounted inside a rear portion of the machine body 2.

The working device 4 has booms 10, a working tool 11, lift links 12, control links 13, boom cylinders 14, and bucket cylinders 15.

The booms 10 are arranged on right and left sides of the cabin 3 and pivotable up and down. The working tool 11 is, for example, a bucket. The bucket 11 is arranged at tip portions (that is, front end portions) of the booms 10 to be movable up and down. The lift links 12 and the control links 13 support a base portion (that is, a rear portion) of the boom 10 so that the boom 10 can be swung up and down. The boom cylinders 14 are extended and contracted to lift and lower the boom 10. The bucket cylinders 15 are extended and contracted to swing the bucket 11 up and down.

Front portions of the right and left booms 10 are connected to each other by a deformed connecting pipe. Base portions (that is, rear portions) of the booms 10 are connected to each other by a circular connecting pipe.

The pair of lift links 12, the pair of control links 13, and the pair of boom cylinders 14 are arranged right and left on the machine body 2, corresponding to the right and left booms 10.

The lift links 12 are extended vertically from rear portions of the base portions of the booms 10. Upper portions (that is, one ends) of the lift links 12 are pivotally joined to the rear portions of the base portions of the booms 10 via respective pivot shafts (referred to as first pivot shafts) 16 rotatably around lateral axes defined by the pivot shafts 16 relative to the rear portions of the base portions of the booms 10. Lower portions (that is, the other ends) of the lift links 12 are pivotally joined to the rear portion of the machine body 2 via respective pivot shafts (referred to as second pivot shafts) 17 rotatably around the lateral axes defined by the pivot shafts 17 relative to the rear portion of the machine body 2. The second pivot shafts 17 are located below the first pivot shafts 16.

Upper portions of the boom cylinders 14 are pivoted on respective pivot shafts (referred to as third pivot shafts) 18 rotatably around lateral axes defined by the pivot shafts 18. The third pivot shafts 18 are provided at the base portions of the booms 10, especially, at front portions of the base portions. Lower portions of the boom cylinders 14 are pivoted on respective pivot shafts 19 rotatably around lateral axes defined by the pivot shafts 19. The fourth pivot shafts 19 are located at a lower portion of the rear portion of the machine body 2 and below the third pivot shafts 18.

The control links 13 are located in front of the lift links 12. One ends of the control links 13 are pivoted on respective pivot shafts (referred to as fifth pivot shafts) 20 rotatably around lateral axes defined by the pivot shafts 20. The fifth pivot shafts 20 are located, in the machine body 2, on positions forward of the lift links 12. The other ends of the control links 13 are pivoted on respective pivot shafts (referred to as sixth pivot shafts) 21 rotatably around lateral axes defined by the pivot shafts 21. The sixth pivot shafts 21 are located, in the boom 10, forward of and above the second pivot shafts 17.

By extending and contracting the boom cylinders 14, the booms 10 are swung up and down around the first pivot shafts 16 with the base portions of the booms 10 supported by the lift links 12 and the control links 13, thereby lifting and lowering the tip end portions of the booms 10. The control links 13 are swung up and down around the fifth pivot shafts 20 by the vertical swinging of the booms 10. The lift links 12 are swung back and forth around the second pivot shafts 17 by the vertical swinging of the control links 13.

An alternative working tool instead of the bucket 11 can be attached to the front portions of the booms 10. For example, an attachment (that is, an auxiliary attachment) such as a hydraulic crusher, a hydraulic breaker, an angle broom, an earth auger, a pallet fork, a sweeper, a mower, a snow blower, or the like may serve as the alternative working tool.

A connector member 50 is located at the front portion of the left boom 10. The connector member 50 is a device configured to connect a hydraulic equipment attached to the auxiliary attachment to a first piping member such as a pipe located on the left boom 10. Specifically, the first piping member can be connected to one end of the connector member 50, and a second piping member connected to the hydraulic equipment of the auxiliary attachment can be connected to the other end. In this manner, an operation fluid flowing in the first piping member passes through the second piping member and is supplied to the hydraulic equipment.

The bucket cylinders 15 are located respectively near the front portions of the booms 10. The bucket cylinders 15 are extended and contracted to swing the bucket 11.

The traveling device 5L is located left on the machine body 2, and the traveling device 5R is located right on the machine body 2. In the embodiment, a crawler type (including a semi-crawler type) traveling device is adopted for the pair of traveling devices 5L and 5R. A wheel-type traveling device having front wheels and rear wheels may also be adopted. For convenience of explanation, the traveling device 5L may be referred to as the left traveling device 5L, and the traveling device 5R may be referred to as the right traveling device 5R.

The prime mover 32 is an internal combustion engine such as a diesel engine, gasoline engine, an electric motor, or the like. In the embodiment, the prime mover 32 is the diesel engine, but is not limited thereto.

The hydraulic system for the working machine 1 will be described below.

As shown in FIG. 1, the hydraulic system for the working machine 1 has a first hydraulic pump P1 and a second hydraulic pump P2. The first hydraulic pump P1 is a pump to be driven by power of the prime mover 32 (see FIG. 9) and includes a constant displacement gear pump. The first hydraulic pump P1 is capable of delivering operation fluid stored in a tank 22. Specifically, the first hydraulic pump P1 discharges operation fluid that is mainly used for control. For convenience of explanation, the tank 22 that stores operation fluid may be referred to as an operation fluid tank. Of the operation fluid delivered from the first hydraulic pump P1, the operation fluid used for control is referred to as pilot fluid, and a pressure of the pilot fluid is referred to as a pilot pressure.

The second hydraulic pump P2 is a pump to be driven by the power of prime mover 32, and includes a constant displacement gear pump. The second hydraulic pump P2 is capable of delivering operation fluid stored in the tank 22 and, for example, supplies the operation fluid to fluid lines of a working system. For example, the second hydraulic pump P2 supplies operation fluid to control valves (that is, flow-rate control valves) that control the boom cylinders 14 for operating the booms 10, the bucket cylinders 15 for operating the bucket, and an auxiliary hydraulic actuator for operating the auxiliary hydraulic actuator.

The hydraulic system for the working machine 1 has a pair of traveling motors 36L and 36R and a pair of traveling pumps 53L and 53R. The pair of traveling motors 36L and 36R output power transmitted to the pair of traveling devices 5L and 5R. The traveling motor 36L transmits rotational power to the traveling device (referred to as a left traveling device) 5L, and the traveling motor 36R transmits rotational power to the traveling device (referred to as a right traveling device) 5R.

The pair of traveling pumps 53L and 53R are pumps to be driven by power of the prime mover 32 and are, for example, swash plate typed variable displacement axial pumps. The traveling pumps 53L and 53R are driven to deliver operation fluid supplied to the respective traveling motors 36L and 36R. The traveling pump 53L supplies the operation fluid to the traveling motor 36L, and the traveling pump 53R supplies the operation fluid to the traveling motor 36R.

For convenience of explanation, the traveling pump 53L may be referred to as a left traveling pump 53L, the traveling pump 53R may be referred to as a right traveling pump 53R, the traveling motor 36L may be referred to as a left traveling motor 36L, and the traveling motor 36R may be referred to as a right traveling motor 36R.

Each of the left traveling pump 53L and the right traveling pump 53R has a pressure receiver portion 53a and a pressure receiver portion 53b to which a pressure (that is, a pilot pressure) of the operation fluid (that is, pilot fluid) from the first hydraulic pump P1 is applied, and angles of the swash plates are changed by the pilot pressures applied to the pressure receiver portions 53A and 53B. By changing the angle of each of the swash plates, the operation fluid delivery amount (that is, delivery flow rate) and direction of each of the left traveling pump 53L and the right traveling pump 53R is changed.

The left traveling pump 53L and the left traveling motor 36L are connected by a connecting fluid line 57h (referred to as a first circulation fluid line), and operation fluid delivered from the left traveling pump 53L is supplied to the left traveling motor 36L. The right traveling pump 53R and the right traveling motor 36R are connected by a connecting fluid line 57i (referred to as a second circulation fluid line), and the operation fluid delivered from the right traveling pump 53R is supplied to the right traveling motor 36R.

The left traveling motor 36L is rotated by the operation fluid delivered from the left traveling pump 53L. By changing a flow rate of operation fluid to the left traveling motor 36L, a rotation speed (that is, a revolving speed) of the left traveling motor 36L can be changed. A swash plate switching cylinder 37L is connected to the left traveling motor 36L. By extending and contracting the swash plate switching cylinder 37L in one direction or the other direction, a rotation speed of the left traveling motor 36L can be changed. That is, when the swash plate switching cylinder 37L is contracted, the rotation speed of the left traveling motor 36L is set so as to correspond to a first speed (referred to as a predetermined low speed range), which is a slower speed position. When the swash plate switching cylinder 37L is extended, a rotation speed of the left traveling motor 36L is set so as to correspond to a second speed (referred to as a predetermined high speed range), which is a faster speed position. That is, a rotation speed of the left traveling motor 36L is shiftable between the first speed and the second speed.

The right traveling motor 36R is rotated by the operation fluid delivered from the right traveling pump 53R. By changing a flow rate of operation fluid to the right traveling motor 36R, a rotation speed of the right traveling motor 36R can be changed. A swash plate switching cylinder 37R is connected to the right traveling motor 36R. By extending and contracting the swash plate switching cylinder 37R in one direction or the other direction, a rotation speed of the right traveling motor 36R can be changed. That is, when the swash plate switching cylinder 37R is contracted, a speed stage of rotation speed of the right traveling motor 36R is set to a first speed (referred to as a predetermined low speed range), which is a slower speed stage. When the swash plate switching cylinder 37R is extended, a speed stage of rotation speed of the right traveling motor 36R is set to a second speed (referred to as a predetermined high speed range), which is a faster speed stage. That is, a rotation speed of the right traveling motor 36R is shiftable between the first speed and the second speed.

As shown in FIG. 1, the hydraulic system for the working machine 1 has a traveling switching valve 34. The traveling switching valve 34 is configured to change rotation speeds of the traveling motors 36L and 36R (that is, the left traveling motor 36L and the right traveling motor 36R) by shifting the rotation speed of each of the left and right traveling motors 36L and 36R between the first speed and the second speed. A state of the traveling switching valve 34 setting the rotation speed stage of each of the left and right traveling motors 36L and 36R to the first speed stage is referred to as a first state of the traveling switching valve 34, and a state of the traveling switching valve 34 setting the rotation speed stage of each of the left and right traveling motors 36L and 36R to the second speed stage is referred to as a second state of the traveling switching valve 34. The travel switching valve 34 includes first switching valves 71L and 71R and a second switching valve 72.

The first switching valve 71L is connected via a fluid line to the swash plate switching cylinder 37L of the left traveling motor 36L, and includes a two-position switching valve shiftable between a first position 71L1 and a second position 71L2. The first switching valve 71L set at the first position 71L1 contracts the swash plate switching cylinder 37L, and the first switching valve 72L set at the second position 71L2 extends the swash plate switching cylinder 37L.

The first switching valve 71R is connected via a fluid line to the swash plate switching cylinder 37R of the right traveling motor 36R, and includes a two-position switching valve shiftable between a first position 71R1 and a second position 71R2. The first switching valve 71R set at the first position 71R1 contracts the swash plate switching cylinder 37R, and the first switching valve 71R set at the second position 71R2 extends the swash plate switching cylinder 37R.

The second switching valve 72 is a solenoid valve for shifting the first switching valve 71L and the first switching valve 71R, and is configured as a two-position switching valve shiftable between a first position 72a and a second position 72b. The second switching valve 72 is connected to the first switching valve 71L and the first switching valve 71R by a fluid line 41. The second switching valve 72 set at the first position 72a switches the first switching valve 71L and the first switching valve 71R to the first positions 71L1 and 71R1, and the second switching valve 72 set at the second position 72b switches the first switching valve 71L and the first switching valve 71R to the second positions 71L2 and 71R2.

The traveling switching valve 34 is set in the first state to contract the swash plate switching cylinders 37L and 37R and to shift rotation speeds of the traveling motors 36L and 36R to the first speed when the second switching valve 72 is set at the first position 72a, the first switching valve 71L is set at the first position 71L1, and the first switching valve 71R is set at the first position 71R1. The traveling switching valve 34 is set in the second state to extend the swash plate switching cylinders 37L and 37R and to shift rotation speeds of the traveling motors 36L and 36R to the second speed when the second switching valve 72 is set at the second position 72b, the first switching valve 71L is set at the second position 71L2, and the first switching valve 71R is set at the second position 71R2. Accordingly, the traveling switching valve 34 allows the traveling motors 36L and 36R to have a common rotation speed stage shiftable between the first speed and the second speed.

An operation device (that is, a traveling operating device) 54 is configured to apply a part of the operation fluid to the pressure receiver portions 53a and 53b of each of the traveling pumps 53L and 53R (that is, the left traveling pump 53L and the right traveling pump 53R) when a traveling operation member 59 is operated, thereby changing the angles of swash plates (referred to as swash plate angles) of the traveling pumps 53L and 53R. The operation device 54 includes the traveling operation member 59 and a plurality of operation valves 55.

The traveling operation member 59 is an operation lever that is supported by the operation valves 55 and swings in a lateral direction (that is, the machine width direction) or the fore- and-aft direction. The traveling operation member 59 is operable to turn to the right and to the left from a neutral position N, and to turn to the front and to the rear from the neutral position N. In other words, the traveling operation member 59 is swingable in at least four directions from the neutral position N. For convenience of explanation, the forward and backward directions, that is, the fore-and-aft direction, may be referred to as a first direction. The rightward and leftward directions, that is, the lateral direction (that is, the machine width direction), are may be referred to as a second direction.

The plurality of operation valves 55 are operated by the common single traveling operation member 59. The plurality of operation valves 55 are operated based on swinging of the traveling operation member 59. An output fluid line 40 is connected to the plurality of operation valves 55, and the part of operation fluid (that is, pilot fluid) from the first hydraulic pump P1 can be supplied to the operation valves 55 through the output fluid line 40. The plurality of operation valves 55 include an operation valve 55A, an operation valve 55B, an operation valve 55C, and an operation valve 55D.

When the traveling operation member 59 is swung forward, i.e., in one of opposite fore-and-aft directions (one of opposite first directions) from the neutral position, or, when a forward directional operation of performed, the operation valve 55A changes a pressure of operation fluid output therefrom according to an operation amount of the forward directional operation. When the traveling operation member 59 is swung backward, i.e., in the other of the opposite fore-and-aft directions (that is, in the other of the opposite first directions, or when a backward directional operation of performed, the operation valve 55B changes a pressure of operation fluid output therefrom according to an operation amount of the backward directional operation. When the traveling operation member 59 is swung rightward, i.e., in one of the opposite lateral directions (one of opposite second directions) from the neutral position, or, when a rightward directional operation of performed, the operation valve 55C changes a pressure of operation fluid output therefrom according to an operation amount of the rightward operation. When the traveling operation member 59 is swung leftward, i.e., in the other of the opposite lateral directions (that is, in the other of the opposite second directions), or when a leftward directional operation of performed), the operation valve 55D changes a pressure of operation fluid output therefrom according to an operation amount of the leftward directional operation.

The plurality of operation valves 55 and the traveling pumps 53L and 53R are connected by the traveling fluid line 45. In other words, the traveling pumps 53L and 53R are hydraulic equipment that are configured to be operated by pilot fluid that is operation fluid output from the operation valves 55 (that is, the operation valves 55A, 55B, 55C, and 55D).

The traveling fluid line 45 has a first traveling fluid line 45a, a second traveling fluid line 45b, a third traveling fluid line 45c, a fourth traveling fluid line 45d, and a fifth traveling fluid line 45e. The first traveling fluid line 45a is a fluid line connected to a pressure-receiving portion (referred to as a first pressure-receiving portion) 53a of the left traveling pump 53L, and is a fluid line through which operation fluid having a pressure (a pilot pressure) applied to the first pressure-receiving portion 53a flows when the traveling operation member 59 is operated. The second traveling fluid line 45b is a fluid line connected to a pressure-receiving portion (referred to as a second pressure-receiving portion) 53b of the left traveling pump 53L, and is a fluid line through which operation fluid having a pressure (a pilot pressure) applied to the second pressure-receiving portion 53b flows when the traveling operation member 59 is operated. The third traveling fluid line 45c is a fluid line connected to a pressure-receiving portion (referred to as a third pressure-receiving portion) 53a of the right traveling pump 53R, and is a fluid line through which operation fluid having a pressure (a pilot pressure) applied to the third pressure-receiving portion 53a flows when the traveling operation member 59 is operated. The fourth traveling fluid line 45d is a fluid line connected to a pressure-receiving portion (referred to as a fourth pressure-receiving portion) 53b of the right traveling pump 53R, and is a fluid line through which operation fluid having a pressure (pilot pressure) applied to the fourth pressure-receiving portion 53b flows when the traveling operation member 59 is operated. The fifth traveling fluid line 45e is a fluid line that connects the operation valves 55 to the first traveling fluid line 45a, the second traveling fluid line 45b, the third traveling fluid line 45c, and the fourth traveling fluid line 45d, respectively.

A plurality of high-pressure selector valves 47a, 47b, 47c, and 47d are located in the fifth traveling fluid line 45e. The plurality of high-pressure selector valves 47a, 47b, 47c, and 47d are connected to the first traveling fluid line 45a, the second traveling fluid line 45b, the third traveling fluid line 45c, and the fourth traveling fluid line 45d, respectively, and selectively supply operation fluid with higher one of pressures (that is, the pilot pressure) therefrom.

When the traveling operation member 59 is swung forward (in a direction indicated by an arrowed line A1 in FIGS. 1 and 2), the operation valve 55A is operated to output a pilot pressure. This pilot pressure is applied to the pressure receiver portion 53a of the left traveling pump 53L via the first traveling fluid line 45a and to the pressure receiver portion 53a of the right traveling pump 53R via the third traveling fluid line 45c. In this manner, the swash plate angles of the left traveling pump 53L and the right traveling pump 53R are changed, the left traveling motor 36L and the right traveling motor 36R rotate forwardly (referred to as forward rotation), and the working machine 1 travels straight forward.

When the traveling operation member 59 is swung backward (in a direction indicated by an arrowed line A2 in FIGS. 1 and 2), the operation valve 55B is operated to output a pilot pressure. This pilot pressure is applied to the pressure receiver portion 53b of the left traveling pump 53L via the second traveling fluid line 45b and to the pressure receiver portion 53b of the right traveling pump 53R via the fourth traveling fluid line 45d. In this manner, the swash plate angles of the left traveling pump 53L and the right traveling pump 53R are changed, the left traveling motor 36L and the right traveling motor 36R rotate reversely (referred to as backward rotation), and the working machine 1 travels straight backward.

When the traveling control member 59 is swung to the right (in a direction indicated by an arrowed line A4 in FIGS. 1 and 2), the control valve 55C is operated to output a pilot pressure. This pilot pressure is applied to the pressure receiver portion 53a of the left traveling pump 53L via the first traveling fluid line 45a, and to the pressure receiver portion 53b of the right traveling pump 53R via the fourth traveling fluid line 45d. In this manner, the swash plate angles of the left traveling pump 53L and the right traveling pump 53R are changed, and the left traveling motor 36L rotates forwardly and the right traveling motor 36R rotates reversely, and the working machine 1 spins to turn rightward (that is, spin turn).

When the traveling control member 59 is swung to the left (in a direction indicated by an arrowed line A3 in FIGS. 1 and 2), the control valve 55D is operated to output a pilot pressure. This pilot pressure is applied to the pressure receiver portion 53a of the right traveling pump 53R via the third traveling fluid line 45c, and to the pressure receiver portion 53b of the left traveling pump 53L via the second traveling fluid line 45b. In this manner, the swash plate angles of the left traveling pump 53L and the right traveling pump 53R are changed, and the left traveling motor 36L rotates reversely and the right traveling motor 36R rotates forwardly, and the working machine 1 spins to turn leftward (that is, spin turn).

When the traveling operation member 59 is swung in an oblique direction (in a direction indicated by an arrowed line A5 in FIG. 2), rotation directions and rotation speeds of the left traveling motor 36L and the right traveling motor 36R are determined by a differential pressure between the pilot pressures applied to the pressure receiving portion 53a and the pressure receiving portion 53b, and the working machine 1 pivots to turn rightward or leftward while it travels forward or backward.

That is, when the traveling operation member 59 is swung obliquely forward to the left, the working machine 1 turns to the left while traveling forward at a speed corresponding to the swing angle of the traveling operation member 59. When the traveling operation member 59 is swung obliquely forward to the right, the working machine 1 turns to the right while traveling forward at a speed corresponding to the swing angle of the traveling operation member 59. When the traveling operation member 59 is swung obliquely backward to the left, the working machine 1 turns to the left while traveling backward at a speed corresponding to the swing angle of the traveling operation member 59. In addition, when the traveling operation member 59 is swung obliquely backward to the right, the working machine 1 turns to the right while it travels backward at a speed corresponding to the swing angle of the traveling operation member 59.

As shown in FIG. 1, the working machine 1 has a controller 60. The controller 60 performs various controls of the working machine 1 and is constituted of semiconductors such as a CPU, a MPU, electrical and electronic circuits, or the like. A mode switch 66, a speed changer switch 67, and a plurality of rotation detectors 68 are electrically connected to the controller 60.

The mode switch 66 is a switch configured to enable or disable automatic deceleration. For example, the mode switch 66 is a switch capable of being switched between on and off. The mode switch 66 when switched on enables the automatic deceleration, and the mode switch 66 when switched off disables the automatic deceleration.

The speed changer switch 67 is located in the vicinity of the driver seat 8 and can be operated by a driver (an operator). The speed changer switch 67 is manually operable to shift each of rotation speed stages of the traveling motors 36L and 36R (that is, the left traveling motor 36L and right traveling motor 36R) to either the first speed or the second speed. For example, the speed changer switch 67 is a seesaw switch operable to selectively perform either an accelerating operation for switching rotation speeds of the traveling motors 36L and 36R from the first speed to the second speed, and a decelerating operation for shifting each of rotation speed stages of the traveling motors 36L and 36R from the second speed to the first speed.

The plurality of rotation detectors 68 includes sensors and the like to detect the current rotation speeds (referred to as motor rotation speeds) of the traveling motors 36L and 36R. The rotation detectors 68 include a first rotation detector 68a configured to detect a motor rotation speed of the left traveling motor 36L (referred to as a first rotation speed) and a second rotation detector 68b configured to detect a motor rotation speed of the right traveling motor 36R (referred to as a second rotation speed).

The controller 60 has an automatic decelerator 61. The automatic decelerator 61 includes an electrical and electronic circuit or the like installed in the controller 60, a computer program stored in the controller 60, or the like. The automatic decelerator 61 executes an automatic deceleration control when automatic deceleration is enabled, and does not execute the automatic deceleration control when the automatic deceleration is disabled.

In the automatic deceleration control, in a state where rotation speeds of the traveling motors 36L and 36R are each set at the second speed, the rotation speeds of the traveling motors 36L and 36R are each automatically reduced by shifting the rotation speed stage of each of the traveling motors 36L and 36R from the second speed to the first speed when a predetermined condition (referred to as an automatic deceleration condition) is satisfied. In detail, in the automatic deceleration control, when the automatic deceleration condition is satisfied at least in a state where the traveling motors 36L and 36R are each set at the second speed, the controller 60 demagnetizes a solenoid of the second switching valve 72 to switch the second switching valve 72 from the second position 72b to the first position 72a, and the rotation speeds of the traveling motors 36L and 36R are reduced by shifting the rotation speed stage of each of the traveling motors 36L and 36R from the second speed to the first speed. That is, when the automatic deceleration control is performed, the controller 60 reduces the rotation speeds of both the left traveling motor 36L and the right traveling motor 36R by shifting the rotation speed stage o ach of the traveling motors 36L and 36R from the second speed to the first speed.

When a predetermined return condition is satisfied after the automatic deceleration is performed, the automatic decelerator 61 magnetizes a solenoid of the second switching valve 72 to switch the second switching valve 72 from the first position 72a to the second position 72b, and increases rotation speeds of the traveling motors 36L and 36R by shifting the rotation speed stage of each of the traveling motors 36L and 36R from the first speed to the second speed. That is, the rotation speed stage of each of the traveling motors 36L and 36R returns to the second speed. In other words, the controller 60 increases the rotation speeds of both the left traveling motor 36L and the right traveling motor 36R by shifting the rotation speed stage of each of the traveling motors 36L and 36R from the first speed to the second speed.

When the automatic deceleration is disabled, the controller 60 performs a manual switching control to switch the rotation speed stage of each of the traveling motors 36L and 36R to either the first speed or the second speed in response to operation of the speed changer switch 67. In the manual switching control, when the speed changer switch 67 is switched to the first speed position, the solenoid of the second switching valve 72 is demagnetized to set the rotation speeds of the traveling motors 36L and 36R to the first speed. In the manual switching control, when the speed changer switch 67 is switched to the second speed, the solenoid of the second switching valve 72 is magnetized to set the rotation speeds of the traveling motors 36L and 36R to the second speed. Even in a state where the automatic deceleration is enabled, the controller 60 may switch the rotation speeds of the traveling motors 36L and 36R to either the first speed or the second speed in the manual switching control when the speed changer switch 67 is operated.

The controller 60 is connected to an acceleration pedal 65 for determining a target revolving speed of the prime mover 32. The acceleration pedal 65 is located in the vicinity of the driver seat 8. The acceleration pedal 65 is an acceleration lever supported swingably, an acceleration pedal supported swingably, an acceleration volume supported rotatably, an acceleration slider supported slidably, or the like. The acceleration pedal 65 is not limited to the examples described above. In addition, the controller 60 is connected to a third rotation detector 69 configured to detect an actual revolving speed of the prime mover 32. The third rotation detector 69 allows the controller 60 to acquire an actual revolving speed of the prime mover 32. Based on an operation amount of the acceleration pedal 65, the controller 60 determines a target revolving speed and controls the actual revolving speed until the actual rotation speed reaches the determined target revolving speed.

The controller 60 performs automatic deceleration based on pressures in the circulation fluid lines 57h and 57i. A plurality of pressure detectors 80 are connected to the circulation fluid lines 57h and 57i. The plurality of pressure detectors 80 include a first pressure detector 80a, a second pressure detector 80b, a third pressure detector 80c, and a fourth pressure detector 80d. The first pressure detector 80a is provided on a portion of the first circulation fluid line 57h extended from one port of the left traveling pump and connected to a first port P11 of the left traveling motor 36L, and detects a first traveling pressure V1 that is a pressure of operation fluid flowing in the portion of the circulation fluid line 57h connected to the first port P11. The second pressure detector 80b is provided on a portion of the first circulation fluid line 57h extended from the other port of the left traveling pump 53L and connected to a second port P12 of the left traveling motor 36L, and detects a second traveling pressure V1 that is a pressure of operation fluid flowing in the portion of the first circulation fluid line 57h connected to the second port P12. The third pressure detector 80c is provided on a portion of the second circulation fluid lie 57i extended from one port of the right traveling pump 53R and connected to a third port P13 of the right traveling motor 36R, and detects a third traveling pressure V3 that is a pressure of operation fluid flowing in the portion of the second circulation fluid line 57i connected to the third port P13. The fourth pressure detector 80d is provided on a portion of the second circulation fluid line 57i extended from the other port of the right traveling pump 53R and connected to a fourth port P14 of the right traveling motor 36R, and detects a pressure of the operation fluid flowing in the portion of the second circulation fluid line 57i connected to the fourth port P14. The installation positions of the first pressure detector 80a, the second pressure detector 80b, the third pressure detector 80c, and the fourth pressure detector 80d on the respective first and second circulation fluid lines 57h and 57i are not limited only if they are configured to detect respective pressures in the respective portions of the first and second circulation fluid lines 57h and 57i interposed between the respective ports of the left and right traveling pumps 53L and 53R and the respective first, second, third and fourth ports P11, P12, P13 and P14 of the left and right traveling motors 36L and 36R.

The controller 60 (that is, the automatic decelerator 61) performs automatic deceleration (a control processing to switch rotation speeds of the traveling motors 36L and 36R from the second speed to the first speed) based on the first traveling pressure V1 detected by the first pressure detector 80a, the second traveling pressure V2 detected by the second pressure detector 80b, the third traveling pressure V3 detected by the third pressure detector 80c, and the fourth traveling pressure V4 detected by the fourth pressure detector 80d.

When rotation speeds of the traveling motors 36L and 36R are set to the second speed and the machine body 2 (or the left traveling device 5L and the right traveling device 5R) pivots to turn left, the controller 60 refers to the third traveling pressure V3 and the fourth traveling pressure V4 corresponding to the right traveling motor 36R, and when the third traveling pressure V3 or the fourth traveling pressure V4 is equal to or higher than a first left threshold $ST1_L$, the controller 60 performs automatic deceleration. In addition, when the rotation speeds of the traveling motors 36L and 36R are set to the second speed and the machine body 2 pivots to turn right, the controller 60 refers to the first traveling pressure V1 and the second traveling pressure V2 corresponding to the left traveling motor 36L, and when the first traveling pressure V1 or the second traveling pressure V2 is equal to or higher than the first right threshold ST1R, automatic deceleration is performed.

Timing of starting the pivot turn is when the traveling operation member 59 is operated in the directions corresponding to the pivoting turn or when the machine body 2 shows behavior of the pivoting turn. A sensor may be provided to detect the operational directions of the traveling operation member 59 shown in FIG. 2. Alternatively, a pressure detector may be provided to detect a pilot pressure of the traveling fluid lines 45 (that is, the first traveling fluid line 45a, the second traveling fluid line 45b, the third traveling fluid line 45c, and the fourth traveling fluid line 45d), where pressures of operation fluid (that is, pilot pressures) are changed due to operation of the traveling operation member 59; thus the controller 60 may detect the operational directions of the traveling operation member 59 based on changing in pilot pressures detected by the pressure detection device. The method to detect the operational directions of the operation member 59 is not limited to the above configuration, and may be performed in other configurations and methods.

The controller 60 performs automatic deceleration based on the traveling pressures V1 to V4 as described above when the traveling operation member 59 or the machine body 2 starts to pivot to turn left after traveling forward, starts to pivot to turn right after traveling forward, starts to pivot to turn left after traveling backward, and starts to pivot to turn right after traveling backward.

In the above-described embodiment, in a case where operation of the traveling operation member 59 or behavior of the machine body 2 shows timing of starting the left pivot turn, it is determined whether to perform automatic deceleration when the third traveling pressure V3 or the fourth traveling pressure V4 is equal to or higher than the first left threshold $ST1_L$, and in a case where operation of the traveling operation member 59 or behavior of the machine body 2 shows timing of starting the right pivot turn, it is determined whether to perform automatic deceleration when the first traveling pressure V1 or the second traveling pressure V2 is equal to or higher than the first right threshold $ST1_R$. In addition to this configuration, it is also possible to determine whether to perform automatic deceleration based on effective differential pressures between the traveling pressures V1 to V4 as follows.

For example, in a case where rotation speeds of the traveling motors 36L and 36R are set to the second speed and the machine body 2 pivots to turn left, the controller 60 calculates the effective third differential pressure $\Delta V3$ (that is, a value obtained by subtracting the fourth traveling pressure V4 from the third traveling pressure V3) corresponding to the right traveling motor 36R and the effective fourth differential pressure $\Delta V4$ (that is, a value obtained by subtracting the third traveling pressure V3 from the fourth traveling pressure V4) corresponding to the right traveling motor 36R. When the third differential pressure $\Delta V3$ or the fourth differential pressure $\Delta V4$ is equal to or higher than the second left threshold $ST2_L$, the controller 60 performs automatic deceleration.

In the case where rotation speeds of the traveling motors 36L and 36R are set to the second speed and the machine body 2 pivots to turn right, the controller 60 calculates the effective first differential pressure $\Delta V1$ (that is, a value obtained by subtracting the second traveling pressure V2 from the first traveling pressure V1) corresponding to the left traveling motor 36L and the effective second differential pressure $\Delta V2$ (that is, a value obtained by subtracting the first traveling pressure V1 from the second traveling pressure V2) corresponding to the left traveling motor 36L. When the first differential pressure $\Delta V1$ or the second differential pressure $\Delta V2$ is equal to or higher than the second right threshold $ST2_R$, the controller 60 performs automatic deceleration.

The controller 60 determines the left thresholds (that is, the first left threshold $ST1_L$ and the second left threshold $ST2_L$) to be used in left pivot turn and the right thresholds (that is, the first right thresholds $ST1_R$ and the second right thresholds $ST2_R$) to be used in right pivot turn, based on rotation speeds of the traveling motors 36L and 36R. That is, the controller 60 determines the left threshold and the right threshold as deceleration thresholds for judging deceleration of automatic deceleration based on rotation speeds of the traveling motors 36L and 36R. For convenience of explanation, the rotation speed of the left traveling motor 36L is hereinafter referred to as a "first rotation speed $LM_{RPM}$", and the rotation speed of the right traveling motor 36R as a "second rotation speed $RM_{RPM}$."

Figure 3:
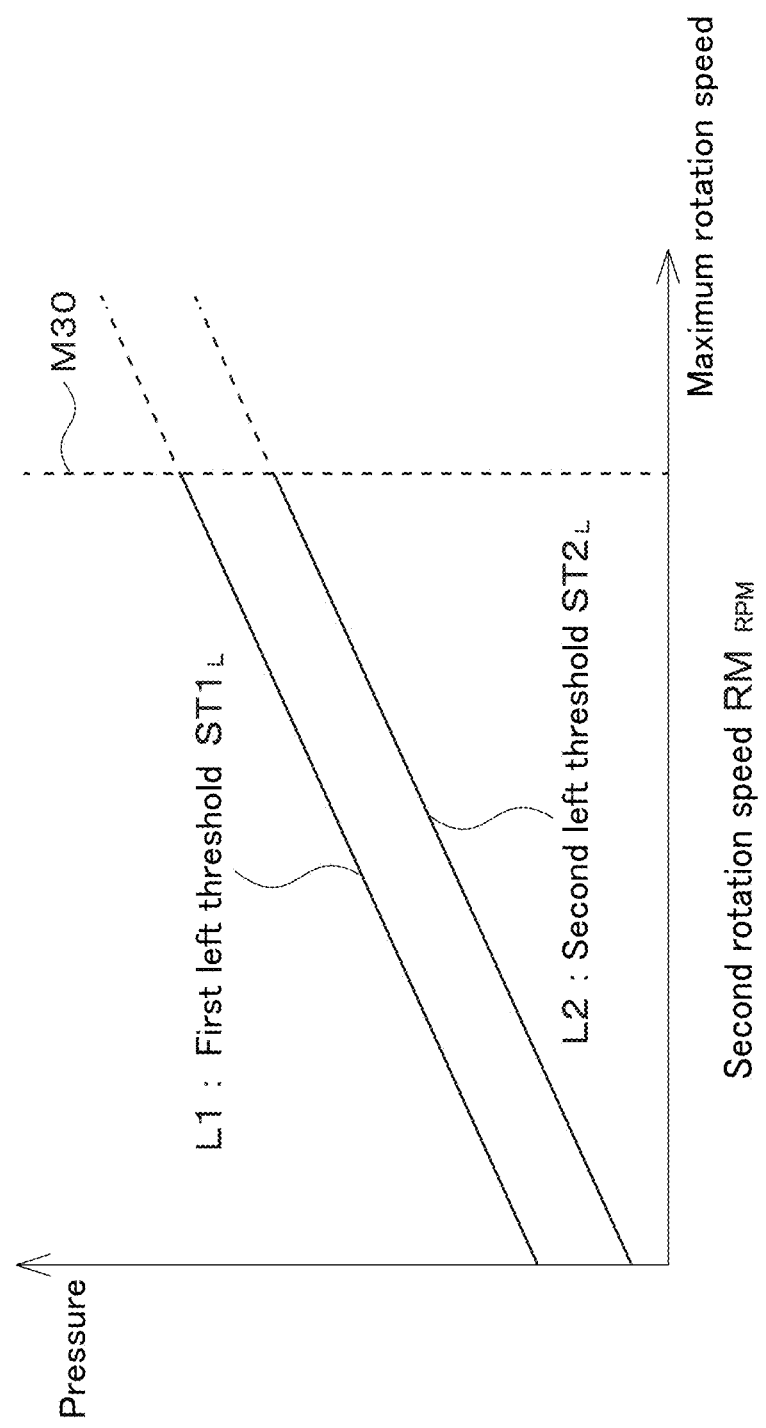
FIG. 3 is a view showing a relationship between a second rotation speed $LM_{RPM}$, a first left threshold $ST1_L$, a second left threshold $ST2_L$.

FIG. 3 shows the relationship between the left thresholds (that is, the first left threshold $ST1_L$ and the second left threshold $ST2_L$) and the second rotation speed $RM_{RPM}$. FIG. 3 shows two left thresholds for convenience of explanation, the first left threshold $ST1_L$ and the second left threshold $ST2_L$, for the second rotation speed $RM_{RPM}$; however, the controller 60 needs determine any one of the first left threshold $ST1_L$ and the second left threshold $ST2_L$.

As shown in FIG. 3, the controller 60 determines the left thresholds (that is, the first left threshold $ST1_L$ and the second left threshold $ST2_L$) to be lower as the second rotation speed $RM_{RPM}$ decreases, and determines the left thresholds to be higher as the second rotation speed $RM_{RPM}$ increases. In addition, the controller 60 may determine the left thresholds (that is, the first left threshold $ST1_L$ and the second left threshold $ST2_L$) by applying the second rotation speed $RM_{RPM}$ detected by the second rotation detector 68b to lines L1 and L2 representing relationships between second rotation speed $RM_{RPM}$ and the left thresholds (that is, the first left threshold $ST1_L$ and the second left threshold $ST2_L$) as shown in FIG. 3. Alternatively, control data such as equations (that is, linear function equations representing the lines L1 and L2 in FIG. 3) or a table, which show the relationships between the second rotation speed $RM_{RPM}$ and the left thresholds $ST1_L$ and $ST2_L$, may be stored in the storage 63 in advance, and the controller 60 may determine the left thresholds (that is, the first left threshold $ST1_L$ and the second left threshold $ST2_L$) by extracting the first left threshold $ST1_L$ and second left threshold $ST2_L$ corresponding to the second rotation speed $RM_{RPM}$ from the control data.

Figure 4:
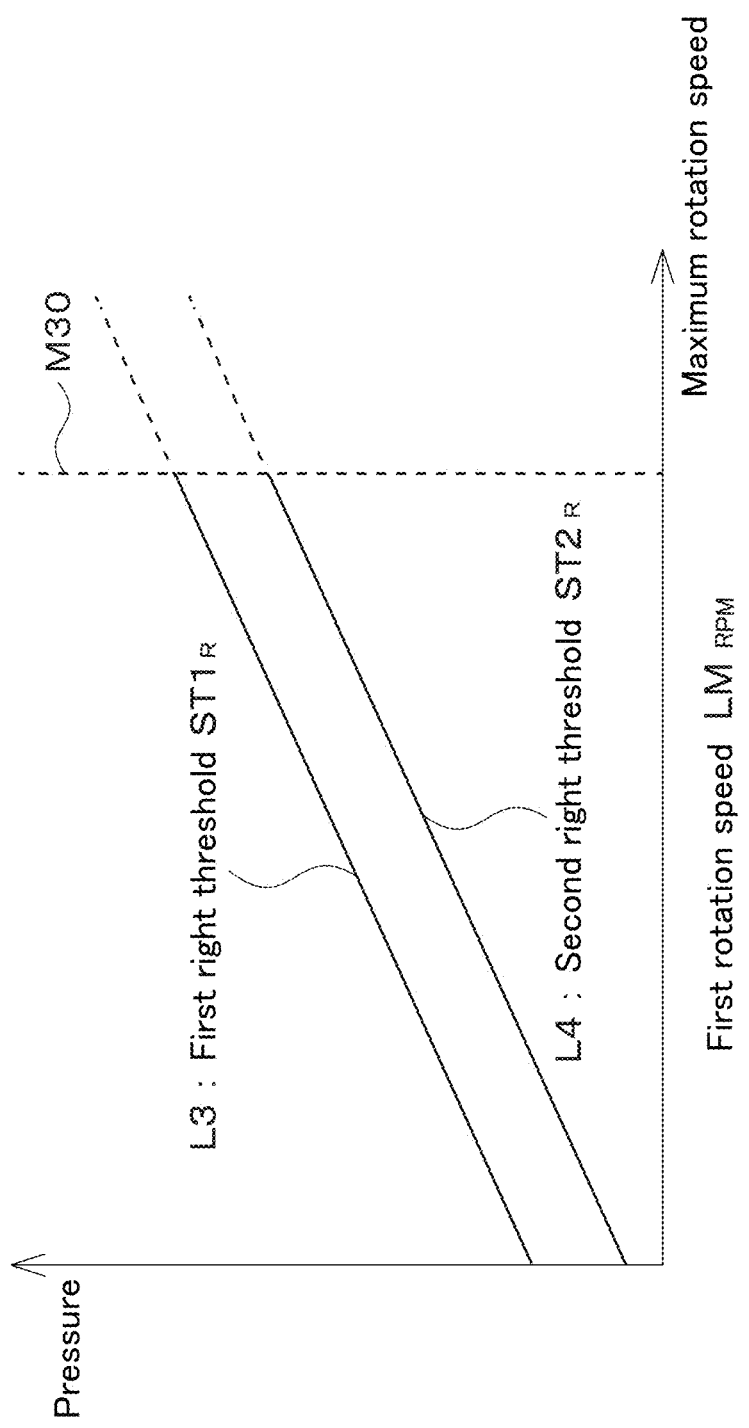
FIG. 4 is a view showing a relationship between a first rotation speed $LM_{RPM}$, a first right threshold $ST1_R$, a second right threshold $ST2_R$.

FIG. 4 shows relationships between the right thresholds (that is, the first right threshold $ST1_R$ and the second right threshold $ST2_R$) and the first rotation speed $LM_{RPM}$. For convenience of explanation, FIG. 3 shows two right thresholds, the first right threshold $ST1_R$ and the second right threshold $ST2_R$, for the first rotation speed $LM_{RPM}$; however, the controller 60 needs determine any one of the first right threshold $ST1_R$ and the second right threshold $ST2_R$.

As shown in FIG. 4, the controller 60 determines the right thresholds (that is, the first right threshold $ST1_R$ and the second right threshold $ST2_R$) to be lower as the first rotation speed $LM_{RPM}$ decreases, and determines the right thresholds to be higher as the first rotation speed $LM_{RPM}$ increases. The controller 60 may determine the right thresholds (that is, the first right threshold $ST1_R$ and the second right threshold $ST2_R$) by applying the first rotation speed $LM_{RPM}$ detected by the first rotation detector 68a to lines L3 and L4 showing the relationships between the first rotation speed $LM_{RPM}$ and the right thresholds (that is, the first right threshold $ST1_R$ and the second right threshold $ST2_R$) as shown in FIG. 4. Alternatively, control data such as an equations (that is, linear function equations representing the lines L3 and L4 in FIG. 4) or a table showing the relationships between the first rotation speed $LM_{RPM}$ and the first right threshold $ST1_R$ and the second right threshold $ST2_R$ may be stored in the storage 63 in advance, and the controller 60 may determine the right thresholds (that is, the first right threshold $ST1_R$ and the second right threshold $ST2_R$) by extracting the first right threshold $ST1_R$ and the second right threshold $ST2_R$ corresponding to the first rotation speed $LM_{RPM}$ detected by the first rotation detector 68a from the control data.

The controller 60 performs automatic deceleration in left pivot turn based on the left thresholds (that is, the first left threshold $ST1_L$ and the second left threshold $ST2_L$) determined according to the second rotation speed $RM_{RP}M$ of the right traveling motor 36R on the opposite side of the left traveling motor 36L. In addition, the controller 60 performs automatic deceleration in right pivot turn based on the right thresholds (that is, the first right threshold $ST1_R$ and the second left threshold $ST2_L$) determined according to the first rotation speed $LM_{RPM}$ of the left traveling motor 36L on the opposite side of the right traveling motor 36R.

In detail, the controller 60 refers to the second rotation speed $RM_{RPM}$ to determine the first left threshold $ST1_L$ in left pivot turn. After determination of the first left threshold $ST1_L$, the controller 60 performs automatic deceleration when the third traveling pressure V3 or the fourth traveling pressure V4 is equal to or higher than the first left threshold $ST1_L$. Alternatively, the controller 60 refers to the second rotation speed $RM_{RPM}$ to determine the second left threshold $ST2_L$ in left pivot turn. After determination of the second left threshold $ST2_L$, the controller 60 performs automatic deceleration when the third differential pressure ΔV3 or the fourth differential pressure ΔV4 is equal to or higher than the second left threshold $ST2_L$.

The controller 60 refers to the first rotation speed $LM_{RPM}$ to determine the first right threshold $ST1_R$ in right pivot turn. After determination of the first right threshold $ST1_R$, the controller 60 performs automatic deceleration when the first traveling pressure V1 or the second traveling pressure V2 is equal to or higher than the first right threshold $ST1_R$. Alternatively, the controller 60 refers to the first rotation speed $LM_{RPM}$ to determine the second right threshold $ST2_R$ in right pivot turn. After determination of the second right threshold $ST2_R$, the controller 60 performs automatic deceleration when the first differential pressure ΔV1 or the second differential pressure ΔV2 is equal to or higher than the second right threshold $ST2_R$.

The controller 60 may change the left thresholds (that is, the first left threshold $ST1_L$ and the second left threshold $ST2_L$) and the right thresholds (that is, the first right threshold $ST1_R$ and the second right threshold $ST2_R$) according to a revolving speed of the prime mover 32.

In the above-described embodiment, as shown in FIGS. 3 and 4, the left and right thresholds (that is, the first left threshold $ST1_L$, second left threshold $ST2_L$, first right threshold $ST1_R$, and second right threshold $ST2_R$) are determined based on the rotation speeds $LM_{RPM}$ and $RM_{RPM}$; however, automatic deceleration does not have to be performed when the rotation speeds $LM_{RPM}$ and $RM_{RPM}$ are a predetermined threshold M30 or above, that is, when rotation speeds of the traveling motors 36L and 36R are in a speed range from the maximum speed to the threshold M30. For convenience of explanation, the left thresholds (that is, the first left threshold $ST1_L$ and second left threshold $ST2_L$) and right thresholds (that is, the first right threshold $ST1_R$ and second right threshold $ST2_R$) at the first speed $LM_{RPM}$ and second speed $RM_{RPM}$ are determined at the threshold M30 or below (that is, the lines L1 and L2 end at the threshold M30); however, there is no problem if the calculation of the left and right thresholds is performed above the threshold M30.

When the machine body 2 spins to turn, the controller 60 determines spin-turn thresholds (that is, the first spin-turn threshold $ST1_P$ and the second spin-turn threshold $ST2_P$), which are deceleration thresholds, to be lower than the left and right thresholds for the pivoting to turn. In addition, the controller 60 determines the spin-turn threshold according to higher (that is, faster) one of the first rotation speed $LM_{RPM}$ of the left traveling motor 36L and the second rotation speed $RM_{RPM}$ of the right traveling motor 36R.

Then, in a case where rotation speeds of the traveling motors 36L and 36R are determined to the second speed and the machine body 2 (or the left traveling device 5L and the right traveling device 5R) spins to turn right or left, the controller 60 performs automatic deceleration when any one of the first traveling pressure V1, the second traveling pressure V2, the third traveling pressure V3, and the fourth traveling pressure V4 is equal to or higher than the first spin-turn threshold $ST1_P$.

Alternatively, in a case where rotation speeds of the traveling motors 36L and 36R are determined to the second speed and the machine body 2 spins to turn right or left, the controller 60 performs automatic deceleration when any one of the first differential pressure ΔV1, the second differential pressure ΔV2, the third differential pressure ΔV3, and the fourth differential pressure ΔV4 is equal to or higher than the second spin-turn threshold $ST2_P$.

In a case where rotation speeds of the traveling motors 36L and 36R are determined to the second speed and the machine body 2 travels straight forward (that is, forward traveling), the controller 60 performs automatic deceleration when either the first traveling pressure V1 or the third traveling pressure V3 is equal to or higher than the first straight-traveling threshold $SF1_S$.

Alternatively, in a case where rotation speeds of the traveling motors 36L and 36R are determined to the second speed and the machine body 2 travels straight forward, the controller 60 performs automatic deceleration when either the first differential pressure ΔV1 or the third differential pressure ΔV3 is equal to or higher than the second straight-traveling threshold $SF2_S$.

Figure 2:
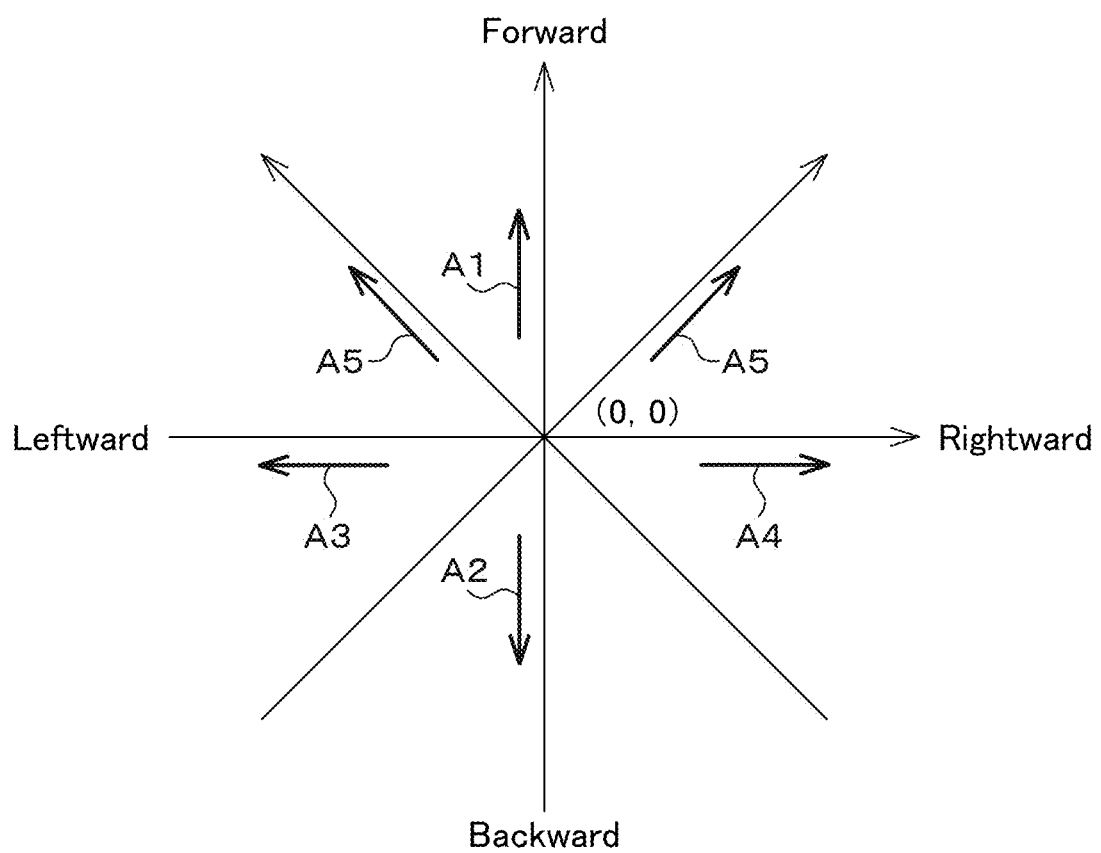
FIG. 2 is a view showing an operational direction of a traveling operation member.

Timing of straight traveling of the machine body 2 is when the traveling operation member 59 is operated in the directions corresponding to forward straight traveling or backward straight traveling or when the machine body 2 shows behavior of the forward straight traveling or the backward straight traveling. An operation of forward or backward straight traveling by the traveling operation member 59 can be detected by a sensor, a pressure detector, or the like, in the same manner as the above-described pivoting to turn. In addition, when an operational direction of the traveling operation member 59 changes from the pivot turn direction to the straight-traveling direction, the controller 60 judges whether to perform automatic deceleration based on the straight-traveling threshold described below. The operation of the traveling operation member 59 for straight traveling is to tilt the traveling operation member 59 to the forward direction and the backward direction, as shown in FIG. 2. And, even when the operational direction of the traveling operation member 59 is oblique, the operation is included in the operation for straight traveling when being in a predetermined range allowable for the operation for straight traveling.

The controller 60 determines the straight-traveling thresholds (that is, the first straight-traveling threshold $SF1_S$ and the second straight-traveling threshold $SF2_S$) based on the rotation difference ΔMP between the first rotation speed $LM_{RPM}$ detected by the first rotation detector 68a and the second rotation speed $RM_{RPM}$ detected by the second rotation detector. The rotation difference ΔMP may be a value obtained by subtracting the second rotation speed $RM_{RPM}$ from the first rotation speed $LM_{RPM}$, or a value obtained by subtracting the first rotation speed $LM_{RPM}$ from the second rotation speed $RM_{RPM}$. If the rotation difference $\Delta MP$ is a negative value, the rotation difference $\Delta MP$ shall be an absolute value.

Figure 5:
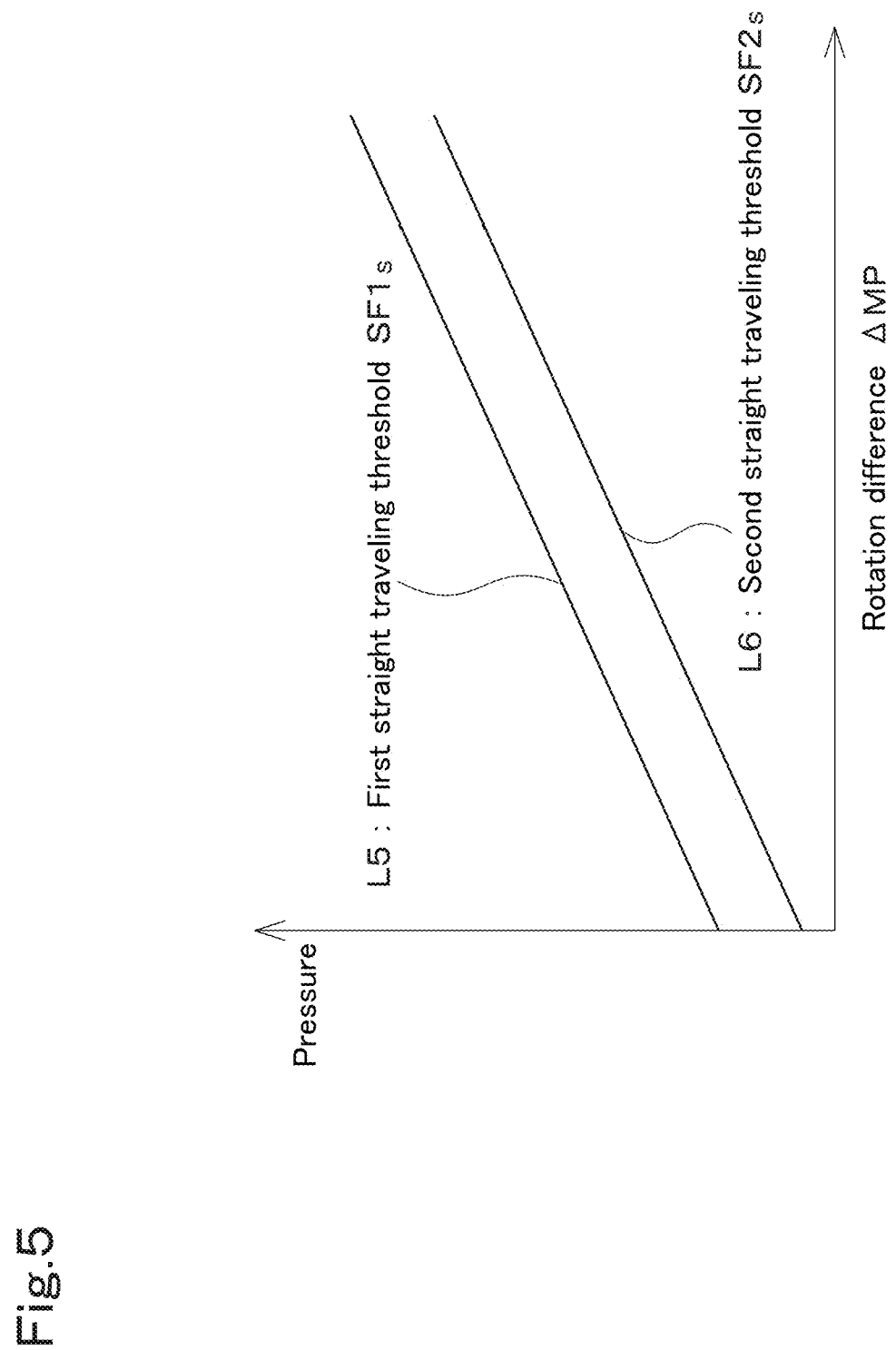
FIG. 5 is a view showing a relationship between a rotation difference $\Delta MP$, a first straight threshold $SF1_S$, and a second straight threshold $SF2_S$.

FIG. 5 shows a relationship between the straight-traveling thresholds (that is, the first straight-traveling threshold $SF1_S$ and the second straight-traveling threshold $SF2_S$) and the rotation difference $\Delta MP$. For convenience of explanation, FIG. 5 shows two straight-traveling thresholds, the first straight-traveling threshold $SF1_S$ and the second straight-traveling threshold $SF2_S$, for the rotation difference $\Delta MP$; however, the controller 60 only needs to determine either the first straight-traveling threshold $SF1_S$ or the second straight-traveling threshold $SF2_S$.

As shown in FIG. 5, the controller 60 determines the straight-traveling thresholds (that is, the first straight-traveling threshold $SF1_S$ and the second straight-traveling threshold $SF2_S$) to be higher as the rotation difference $\Delta MP$ increases, and determines the straight-traveling threshold to be lower as the rotation difference $\Delta MP$ decreases. As shown in FIG. 5, the controller 60 may determine the first straight-traveling threshold $SF1_S$ and the second straight-traveling threshold $SF2_S$ by applying the calculated rotation difference $\Delta MP$ to lines L5 and L6 that show the relationships between the straight-traveling thresholds $SF1_S$ and $SF2_S$ and the rotation difference $\Delta MP$. Alternatively, control data such as equations (that is, linear function equations representing the lines L5 and L6 in FIG. 5) or a table showing the relationships between the rotation difference $\Delta MP$ and the straight-traveling thresholds $SF1_S$ and $SF2_S$ may be stored in the storage 63 in advance, and the controller 60 may extract the first straight-traveling threshold $SF1_S$ and the second straight-traveling threshold $SF2_S$ corresponding to the calculated rotation difference $\Delta MP$ from the control data.

That is, the controller 60 performs automatic deceleration based on the straight-traveling thresholds (that is, the first straight-traveling threshold $SF1_S$ and the second straight-traveling threshold $SF2_S$) determined according to the rotation difference $\Delta MP$ between the first rotation speed $LM_{RPM}$ and the second rotation speed $RM_{RPM}$ in traveling straight forward, that is, in forward traveling.

In detail, the controller 60 refers to the first rotation speed $LM_{RPM}$ and the second rotation speed $RM_{RPM}$ in forward traveling to calculate the rotation difference $\Delta MP$, and determines the first straight-traveling threshold $SF1_S$ according to the calculated rotation difference $\Delta MP$. After determination of the first straight traveling threshold $SF1_S$, the controller 60 performs automatic deceleration when the first traveling pressure V1 or the third traveling pressure V3 is equal to or higher than the first straight traveling threshold $SF1_S$. Alternatively, the controller 60 calculates the rotation difference $\Delta MP$ in forward traveling, and determines the second straight traveling threshold $SF2_S$ according to the calculated rotation difference $\Delta MP$. After determination of the second straight traveling threshold $SF2_S$, the controller 60 performs automatic deceleration when the first differential pressure $\Delta V1$ or the third differential pressure $\Delta V3$ is equal to or higher than the second straight traveling threshold $SF2_S$.

In the embodiment described above, the first straight-traveling threshold $SF1_S$ and the second straight-traveling threshold $SF2_S$ are acquired based on the rotation difference $\Delta MP$; alternatively, the first straight-traveling threshold $SF1_S$ and the second straight-traveling threshold $SF2_S$ may be acquired based on a rotation-ratio difference $\Delta DP$. The rotation-ratio difference $\Delta DP$ is a difference between a first ratio acquired by dividing the second rotation speed $RM_{RPM}$ by the first rotation speed $LM_{RPM}$ and a second ratio acquired by dividing the first rotation speed $LM_{RPM}$ by the second rotation speed $RM_{RPM}$. If the rotation-ratio difference $\Delta DP$ is a negative value, the absolute value shall be applied.

The controller 60 acquires the rotation-ratio difference $\Delta DP$ using the first rotation speed $LM_{RPM}$ and the second rotation speed $RM_{RPM}$, and determines the straight-traveling thresholds (that is, the first straight-traveling threshold $SF1_S$ and the second straight-traveling threshold $SF2_S$) based on the rotation-ratio difference $\Delta DP$.

Figure 6A:
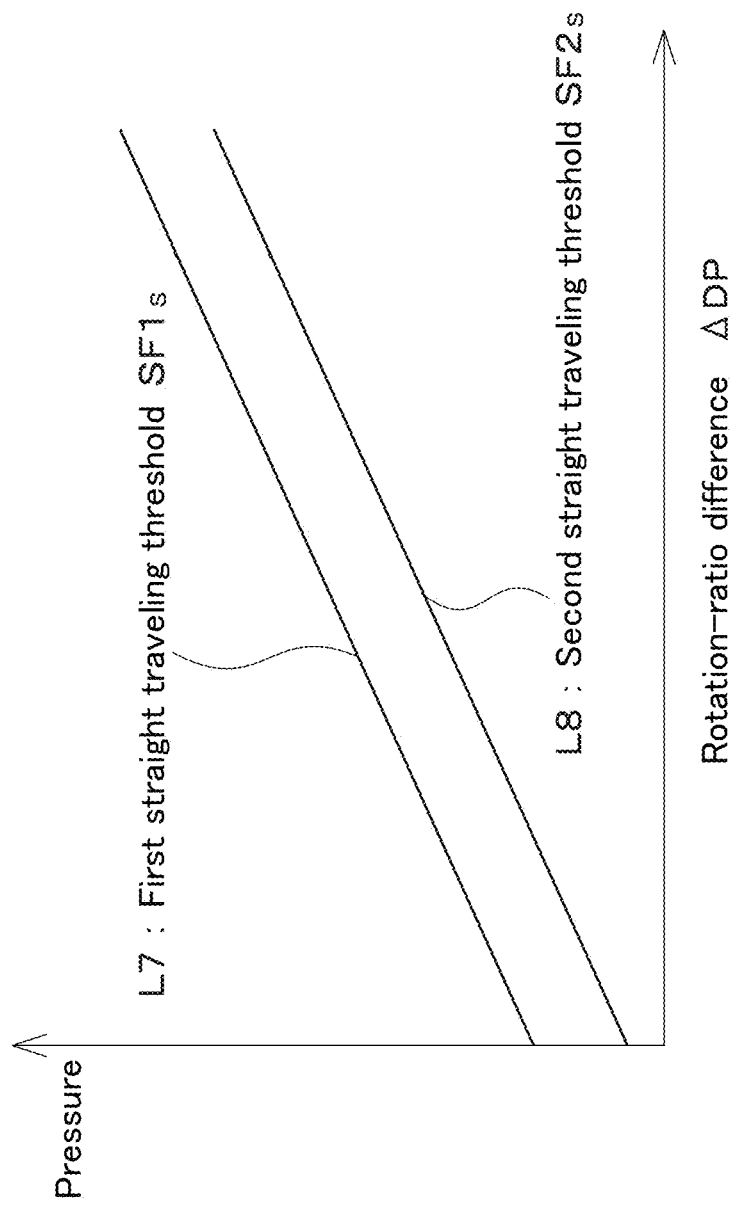
FIG. 6A is a view showing a relationship between a rotation-ratio difference $\Delta DP$, and the straight thresholds $SF1_S$ and $SF2_S$.

FIG. 6A shows relationships between the straight-traveling thresholds (that is, the first straight-traveling threshold $SF1_S$ and the second straight-traveling threshold $SF2_S$) and the rotation-ratio difference $\Delta DP$. For convenience of explanation, FIG. 6 shows two straight-traveling thresholds, the first straight-traveling threshold $SF1_S$ and the second straight-traveling threshold $SF2_S$, for the rotation-ratio difference $\Delta DP$, but the controller 60 only needs to determine any one of the first straight-traveling threshold $SF1_S$ and the second straight-traveling threshold $SF2_S$.

As shown in FIG. 6A, the controller 60 determines the straight-traveling thresholds (that is, the first straight-traveling threshold $SF1_S$ and the second straight-traveling threshold $SF2_S$) to be higher as the rotation-ratio difference $\Delta DP$ increases, and determines the straight-traveling threshold to be lower as the rotation-ratio difference $\Delta DP$ decreases. As shown in FIG. 6A, the controller 60 may determine the first straight-traveling threshold $SF1_S$ and the second straight-traveling threshold $SF2_S$ by applying the calculated rotation-ratio difference $\Delta DP$ to lines L7 and L8 that show the relationships between the straight-traveling thresholds $SF1_S$ and $SF2_S$ and the rotation-ratio difference $\Delta DP$. Alternatively, control data such as equations (that is, linear function equations representing the lines L7 and L8 in FIG. 6A) or a table showing the relationships between the rotation-ratio difference $\Delta DP$ and the straight-traveling thresholds $SF1_S$ and $SF2_S$ may be stored in the storage 63 in advance, and the controller 60 may determine the first straight-traveling threshold $SF1_S$ and the second straight-traveling threshold $SF2_S$ by extracting the first straight-traveling threshold $SF1_S$ and the second straight-traveling threshold $SF2_S$ corresponding to the calculated rotation-ratio difference $\Delta DP$ from the control data.

That is, in forward traveling, the controller 60 performs automatic deceleration based on the straight-traveling thresholds (that is, the first straight-traveling threshold $SF1_S$ and the second straight-traveling threshold $SF2_S$) determined based on the rotation-ratio difference $\Delta DP$ between the first rotation speed $LM_{RPM}$ and the second rotation speed $RM_{RPM}$.

In detail, the controller 60 refers to the first rotation speed $LM_{RPM}$ and the second rotation speed $RM_{RPM}$ in forward traveling to calculate the rotation-ratio difference $\Delta DP$, and determines the first straight-traveling threshold $SF1_S$ based on the calculated rotation-ratio difference $\Delta DP$. After determination of the first straight traveling threshold $SF1_S$, the controller 60 performs automatic deceleration when the first traveling pressure V1 or the third traveling pressure V3 is equal to or higher than the first straight traveling threshold $SF1_S$. Alternatively, the controller 60 calculates the rotation-ratio difference $\Delta DP$ in forward traveling, and determines the second straight traveling threshold $SF2_S$ based on the calculated rotation-ratio difference $\Delta DP$. After determination of the second straight-traveling threshold $SF2_S$, the controller 60 performs automatic deceleration when the first differential pressure ΔV1 or the third differential pressure ΔV3 is equal to or higher than the second straight-traveling threshold $SF2_S$.

In the above-described embodiment, the straight-traveling thresholds (that is, the first straight-traveling threshold $SF1_S$ and the second straight-traveling threshold $SF2_S$) are determined based on the rotation-ratio difference ΔDP, but the straight-traveling thresholds (that is, the first straight-traveling threshold $SF1_S$ and the second straight-traveling threshold $SF2_S$) may be determined based on a ratio (that is, a rotation ratio) ΔDQ between the first rotation speed $LM_{RPM}$ and the second rotation speed $RM_{RPM}$.

Figure 6B:
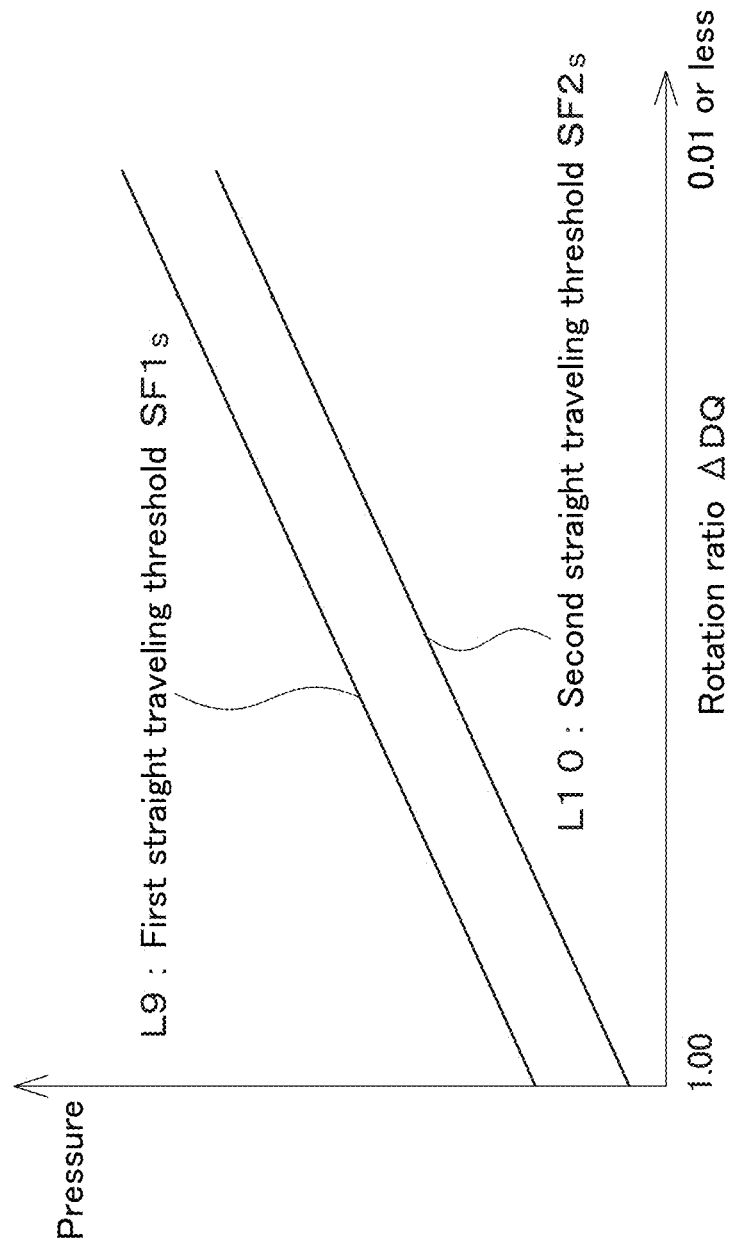
FIG. 6B is a view showing a relationship between a rotation ratio $\Delta DQ$, and the straight thresholds $SF1_S$ and $SF2_S$.

As shown in FIG. 6B, the controller 60 determines the straight-traveling thresholds (that is, the first straight-traveling threshold $SF1_S$ and the second straight-traveling threshold $SF2_S$) to be higher as the rotation ratio ΔDQ decreases, and determines the straight-traveling threshold to be lower as the rotation ratio ΔDQ increases. As shown in FIG. 6B, the controller 60 may determine the first straight-traveling threshold $SF1_S$ and the second straight-traveling threshold $SF2_S$ by applying the calculated rotation ratio ΔDQ to lines L9 and L10 that show the relationships between the straight-traveling thresholds $SF1_S$ and $SF2_S$ and the rotation ratio ΔDQ. Alternatively, control data such as equations (that is, linear function equations representing the lines L9 and L10 in FIG. 6B) or a table showing the relationships between the rotation ratio ΔDQ and the straight-traveling thresholds $SF1_S$ and $SF2_S$ may be stored in the storage 63 in advance, and the controller 60 may determine the first straight-traveling threshold $SF1_S$ and the second straight-traveling threshold $SF2_S$ by extracting the first straight-traveling threshold $SF1_S$ and the second straight-traveling threshold $SF2_S$ corresponding to the calculated rotation ratio ΔDQ from the control data.

That is, the controller 60 performs automatic deceleration in forward traveling based on the straight-traveling thresholds (that is, the first straight-traveling threshold $SF1_S$ the second straight-traveling threshold $SF2_S$) determined by the rotation ratio ΔDQ between the first rotation speed $LM_{RPM}$ and the second rotation speed $RM_{RPM}$.

In detail, the controller 60 refers to the first rotation speed $LM_{RPM}$ and the second rotation speed $RM_{RPM}$ in forward traveling to calculate the rotation ratio ΔDQ, and determines the first straight-traveling threshold $SF1_S$ based on the calculated rotation ratio ΔDQ. After determination of the first straight traveling threshold $SF1_S$, the controller 60 performs automatic deceleration when the first traveling pressure V1 or the third traveling pressure V3 is equal to or higher than the first straight traveling threshold $SF1_S$. Alternatively, the controller 60 calculates the rotation ratio ΔDQ in forward traveling, and determines the second straight traveling threshold $SF2_S$ based on the calculated rotation ratio ΔDQ. After determination of the second straight-traveling threshold $SF2_S$, the controller 60 performs automatic deceleration when the first differential pressure ΔV1 or the third differential pressure ΔV3 is equal to or higher than the second straight-traveling threshold $SF2_S$.

In the above-described embodiment, the first straight-traveling threshold $SF1_S$ and the second straight-traveling threshold $SF2_S$ are determined based on the rotation difference ΔMP or the rotation-ratio difference ΔDP, but alternatively, the first straight-traveling threshold $SF1_S$ and the second straight-traveling threshold $SF2_S$ may be determined based on the first rotation speed $LM_{RPM}$ and the second rotation speed $RM_{RPM}$.

As shown in FIG. 7, the controller 60 determines the straight-traveling thresholds (that is, the first straight-traveling threshold $SF1_S$ and the second straight-traveling threshold $SF2_S$) to be lower as the first speed $LM_{RPM}$ and the second speed $RM_{RPM}$ decrease, and determines the straight-traveling thresholds to be higher as the first speed $LM_{RPM}$ and the second speed $RM_{RPM}$ increase. As shown in FIG. 7, the controller 60 may determine first straight-traveling threshold $SF1_S$ and the second straight-traveling threshold $SF2_S$ by applying the first rotation speed $LM_{RPM}$ detected by the first rotation detector 68a and the second rotation speed $RM_{RPM}$ detected by the second rotation detector 68b to lines L11 and L12 showing the relationships between the straight-traveling thresholds $SF1_S$ and $SF2_S$ and the rotation speeds $LM_{RPM}$ and $RM_{RPM}$. Alternatively, control data such as equations (that is, linear function equations representing the lines L11 and L12 in FIG. 7) or a table showing the relationships between the rotation speeds $LM_{RPM}$ and $RM_{RPM}$ and the straight-traveling thresholds $SF1_S$ and $SF2_S$ may be stored in the storage 63 in advance, and the controller 60 may determine the first straight-traveling threshold $SF1_S$ and the second straight-traveling threshold $SF2_S$ by extracting the first straight-traveling threshold $SF1_S$ and the second straight-traveling threshold $SF2_S$ corresponding to the first rotation speed $LM_{RPM}$ and the second rotation speed $RM_{RPM}$ from the control data.

That is, the controller 60 performs automatic deceleration based on the straight-traveling thresholds (that is, the first straight-traveling threshold $SF1_S$ and the second straight-traveling threshold $SF2_S$) determined by the first rotation speed $LM_{RPM}$ and the second rotation speed $RM_{RPM}$ in forward traveling.

In detail, the controller 60 refers to the first rotation speed $LM_{RPM}$ and the second rotation speed $RM_{RPM}$ in forward traveling, and determines the first straight-traveling threshold $SF1_S$ based on the first rotation speed $LM_{RPM}$ and the second rotation speed $RM_{RPM}$. After determination of the first straight traveling threshold $SF1_S$, the controller 60 performs automatic deceleration when both the first traveling pressure V1 and the third traveling pressure V3 are continuously equal to or higher than the first straight traveling threshold $SF1_S$. In detail, when a length of time (that is, elapsed time) during which both the first traveling pressure V1 and the third traveling pressure V3 are equal to or higher than the first straight traveling threshold $SF1_S$ is equal to or longer than a first judgment time, the controller 60 performs automatic deceleration. The controller 60 determines the first judgment time to be shorter as the first rotation speed $LM_{RPM}$ or the second rotation speed $RM_{RPM}$ increase, and determines the first judgment time to be longer as the first rotation speed $LM_{RPM}$ or the second rotation speed $RM_{RPM}$ decrease.

Alternatively, in forward traveling, the controller 60 refers to the first rotation speed $LM_{RPM}$ and the second rotation speed $RM_{RPM}$, and determines the second straight-traveling threshold $SF2_S$ based on the first rotation speeds $LM_{RPM}$ and the second rotation speed $RM_{RPM}$. After determination of the second straight-traveling threshold $SF2_S$, the controller 60 performs automatic deceleration when both the first differential pressure ΔV1 and the third differential pressure ΔV3 are continuously equal to or higher than the second straight-traveling thresholds $SF2_S$. In detail, when a length of time (that is, elapsed time) during which both the first differential pressure ΔV1 and the third differential pressure ΔV3 are equal to or higher than the second straight-traveling thresholds $SF2_S$ is equal to or longer than a second judgment time, the controller 60 performs automatic deceleration. The controller 60 determines the second judgment time to be shorter as the first speed $LM_{RPM}$ or the second speed $RM_{RPM}$ increase, and determines the second judgment time to be longer as the first speed $LM_{RPM}$ or the second speed $RM_{RPM}$ decrease.

In the above-described embodiment, the controller 60 does not perform automatic deceleration when the traveling operation member 59 is operated in a direction for forward traveling of the machine body 2 and the left traveling motor 36L and the right traveling motor 36R are rotating in a direction corresponding to backward traveling of the machine body 2 backward, that is, in reversely rotating.

The controller 60 does not perform automatic deceleration when the first rotation speed $LM_{RPM}$ of the left traveling motor 36L is equal to or higher than a predetermined rotation speed, or when the second rotation speed $RM_{RPM}$ of the right traveling motor 36R is equal to or higher than a predetermined rotation speed. For example, the controller 60 does not perform automatic deceleration when the first rotation speed $LM_{RPM}$ of the left traveling motor 36L is equal to or higher than a first maximum rotation speed of the left traveling motor 36L. The controller 60 does not perform automatic deceleration when the second rotation speed $RM_{RPM}$ of the right traveling motor 36R is equal to or higher than a second maximum rotation speed of the right traveling motor 36R. According to this configuration, workability can be improved without performing automatic deceleration when the first rotation speed $LM_{RPM}$ and the second rotation speed $RM_RPM$ are at high speeds.

Figure 8A:
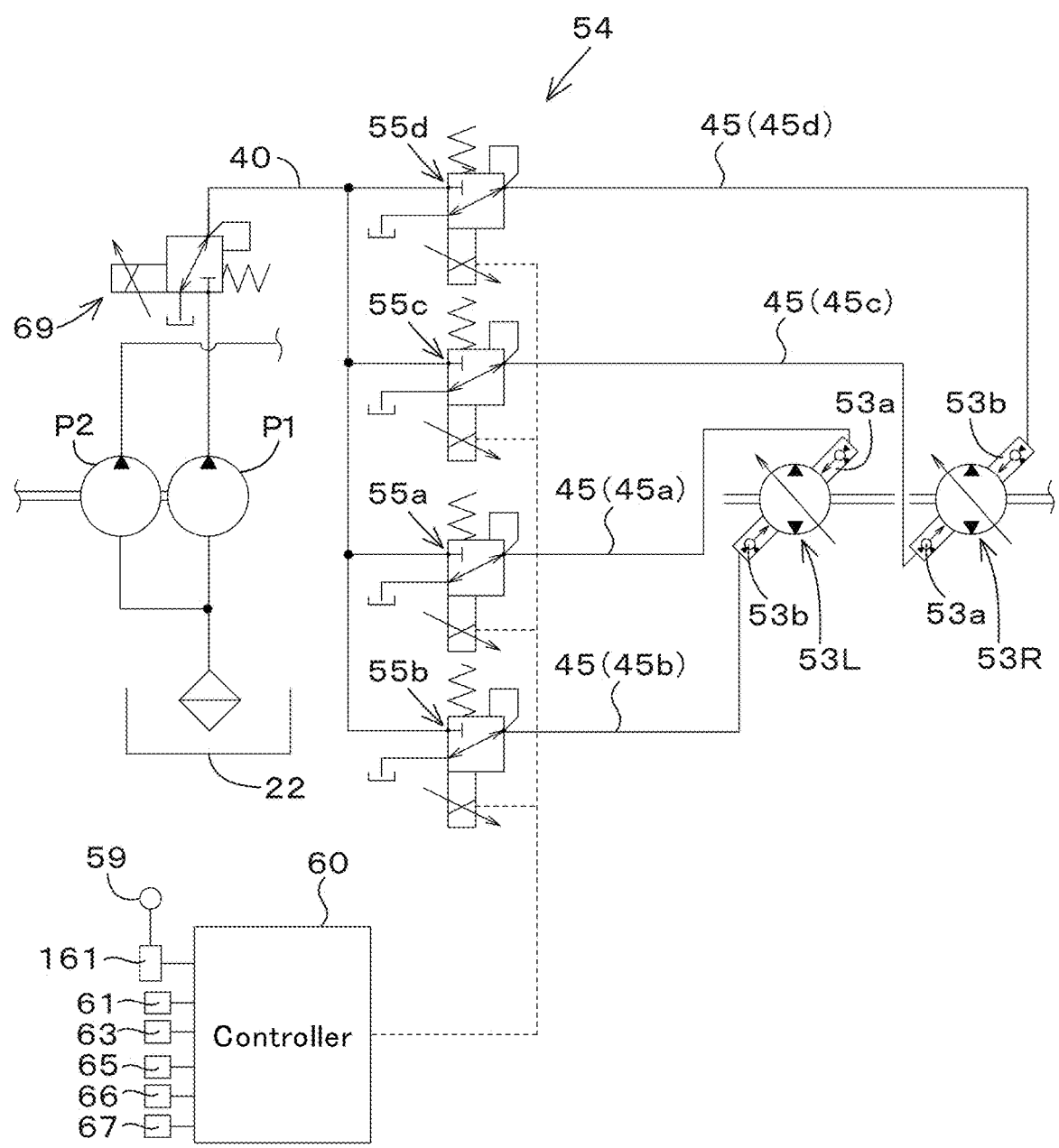
FIG. 8A is a view showing a modified example of a traveling operation device.
Figure 8B:
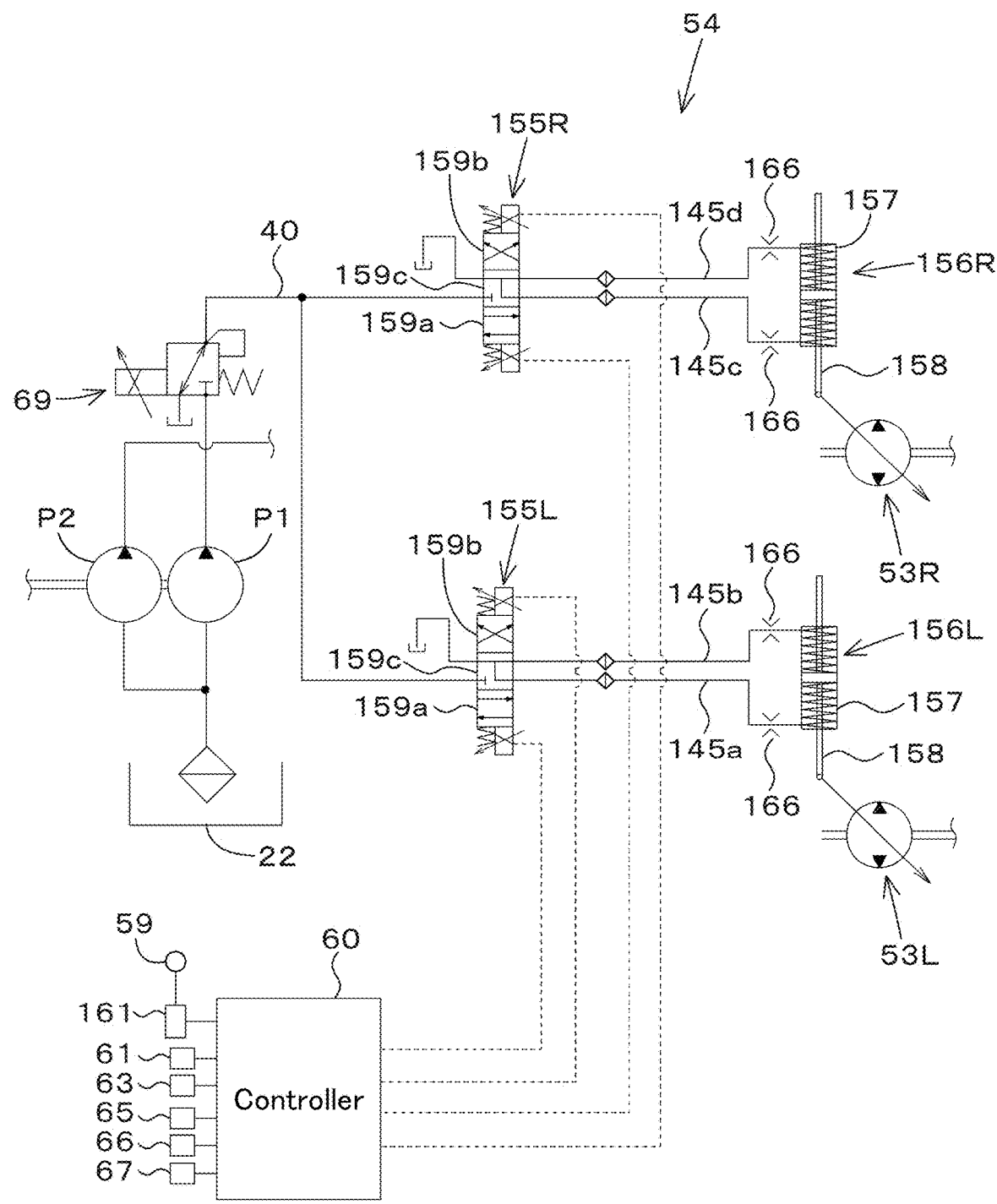
FIG. 8B is a view showing a modified example of another traveling operation device.

In the above-described embodiment, the hydraulic traveling operation device 54 configured to change a pilot pressure applied to the traveling pumps (that is, the first traveling pump 53L and the second traveling pump 53R) using the operation valves 55, but alternatively, an electrically-operated traveling operation device 54 may be used as shown in FIGS. 8A and 8B, for example. In this case, the traveling operation member 59 may be constituted of an electrically-actuated operation member such as a joystick.

The traveling operation device 54 shown in FIG. 8A has the operation valves 55a, 55b, 55c, and 55d, which are constituted of solenoid proportional valves. The controller 60 is connected to an operation detection sensor 161 to detect an operation extent and operational directions of the operation member 59 that is swung in the lateral direction (that is, the machine width direction) or the fore-and-aft direction. The controller 60 controls the operation valves 55a, 55b, 55c, and 55d based on the operation extent and operational directions of the operation member 59 detected by the operation detection sensor 161.

When the operating member 59 is operated forward (in a direction A1 in FIG. 2), the controller 60 outputs a control signal to the operation valve 55a and the operation valve 55c to turn the swash plates of the first traveling pump 53L and the second traveling pump 53R in respective directions for normal rotation of the left traveling motor 36L and the right traveling motor 36R (that is, forward traveling of the left and right traveling devices 5), thereby rotating the left and right traveling motors 36L and 36R forward (normally).

When the operating member 59 is operated backward (in a direction A2 in FIG. 2), the controller 60 outputs a control signal to the operation valve 55b and the operation valve 55d to turn the swash plates of the first traveling pump 53L and the second traveling pump 53R in respective directions for reverse rotation of the left traveling motor 36L and 36R (that is, backward traveling of the left and right traveling devices 5), thereby rotating the left and right traveling motors 36L and 36R backward (reversely).

When the operating member 59 is operated rightward (in a direction A4 in FIG. 2), the controller 60 outputs a control signal to the operation valve 55a and the operation valve 55d to turn the swash plate of the first traveling pump 53L in the direction for normal rotation of the left traveling motor 36L and to turn the swash plate of the second traveling pump 53R in the direction for reverse rotation of the right traveling motor 36R, thereby rotating the first traveling pump 53L normally, and rotating the second traveling pump 53R reversely.

Further, when the operating member 59 is operated leftward (in a direction A3 in FIG. 2), the controller 60 outputs a control signal to the operation valve 55b and the operation valve 55c to turn the swash plate of the first traveling pump 53L in the direction for reverse rotation of the left traveling motor 36L and to turn the swash plate of the second traveling pump 53R in the direction for normal rotation of the right traveling motor 36R, thereby rotating the left traveling motor 36L reversely, and rotating the right traveling motor 36R normally.

The traveling operation device 54 shown in FIG. 8B has operation valves 155L and 155R and hydraulic regulators 156L and 156R. Each of the hydraulic regulators 156L and 156R has a supply chamber 157 to which operation fluid can be supplied and a piston rod 158 located in the supply chamber 157. The piston rod 158 of the hydraulic pressure regulator 156L is connected to the swash plate of the first traveling pump 53L. The piston rod 158 of the hydraulic pressure regulator 156R is connected to the swash plate of the second traveling pump 53R. Angles of the swash plates of traveling pumps 53L and 53R are changed due to the operations (in straight-line movements) of the piston rods 158 of the hydraulic regulators 156L and 156R.

The operation valve 155L is a solenoid proportional valve to operate the hydraulic regulator 156L and is switchable between a first position 159a, a second position 159b, and a neutral position 159c. The positions of the operation valve 155L are changed through movement of the spool of the valve 155L based on the control signal output from the controller 60. A first port of the operation valve 155L is connected to the supply chamber 157 of the hydraulic regulator 156L by the first traveling fluid line 145a. A second port of the operation valve 155L is connected to the supply chamber 157 of the hydraulic regulator 156L by the second traveling fluid line 145b.

The operation valve 155R is a solenoid proportional valve to operate the hydraulic regulator 156R and is switchable between a first position 159a, a second position 159b, and a neutral position 159c. The positions of the operation valve 155R are changed through movement of the spool of the valve 155R based on the control signal output from the controller 60. A first port of the operation valve 155R is connected to the supply chamber 157 of the hydraulic regulator 156R by the third traveling fluid line 145c. A second port of the operation valve 155R is connected to the supply chamber 157 of the hydraulic regulator 156R by the fourth traveling fluid line 145d.

The controller 60 outputs a control signal to the operation valve 155L and the operation valve 155R to switch the operation valve 155L and the operation valve 155R to the first position 159a. In this manner, the swash plates of the first traveling pump 53L and the second operating pump 53R turn in the respective directions for normal rotation of the left and right traveling motors 36L and 36R, and thereby rotating the first traveling pump 53L and the second traveling pump 53R normally.

The controller 60 outputs a control signal to the operation valve 155L and the operation valve 155R to switch the operation valve 155L and the operation valve 155R to the second position 159b. In this manner, the swash plates of the first traveling pump 53L and the second operating pump 53R turn in the respective directions for reverse rotation of the left and right traveling motors 36L and 36R, and thereby rotating the first traveling pump 53L and the second traveling pump 53R reversely.

In addition, the controller 60 outputs a control signal to the operation valve 155L and the operation valve 155R to switch the operation valve 155L to the first position 159a and to switch the operation valve 155R to the second position 159b. In this manner, the swash plate of the first traveling pump 53L turns in the direction for normal rotation of the left and right traveling motors 36L and 36R, thereby rotating the first traveling pump 53L normally, and the swash plate of the second operating pump 53R turns in the direction for reverse rotation of the right traveling motor 36R, thereby rotating the second traveling pump 53R reversely.

Further, the controller 60 outputs a control signal to the operation valve 155L and the operation valve 155R to switch the operation valve 155L to the second position 159b and to switch the operation valve 155R to the first position 159a. In this manner, the swash plate of the first traveling pump 53L turns in the direction for reverse rotation of the left traveling motor 36L, thereby rotating the first traveling pump 53L reversely, and the swash plate of the second operating pump 53R turns in the direction for forward rotation of the right traveling motor 36R, thereby rotating the second traveling pump 53R normally.

Electric actuators such as the solenoid proportional valves 155a to 155d, 155L, and 155R described above may be used to change the angles of the swash plates of the traveling motors 36L and 36R.

According to the above embodiment, the working machine 1 has the structures and provides effects as follows.

The working machine 1 incudes the machine body 2, the left traveling device 5L located left on the machine body 2, the right traveling device 5R located right on the machine body 2, the left traveling motor 36L to output a power transmitted to the left traveling device 5L, the right traveling motor 36R to output a power transmitted to the right traveling device 5R, the first rotation detector 68a to detect the first rotation speed $LM_{RPM}$ of the left traveling motor 36L, the second rotation detector 68b to detect the second rotation speed $RM_{RPM}$ of the right traveling motor 36R, the left traveling pump 53L to supply operation fluid to the left traveling motor 36L, the right traveling pump 53R to supply operation fluid to the right traveling motor 36L, the traveling operation device 54 to operate at least one of the left traveling pump 53L and the right traveling pump 53R, and the controller 60 configured or programmed to perform automatic deceleration to automatically reduce the first rotation speed $LM_{RPM}$ and the second rotation speed $RM_{RPM}$ by shifting a speed stage of each of the left and right traveling motors 36L and 36R from a second speed to a first speed that is lower than the second speed. The controller 60 is configured or programmed to determine, based on the second rotation speed $RM_RPM$, the left thresholds (that is, the first left threshold $ST1_L$ and the second left threshold $ST2_L$) for judging whether to perform the automatic deceleration in left pivot turn of the machine body 2, and to determine, based on the first rotation speed $LM_{RPM}$, the right thresholds (that is, the first right threshold $ST1_R$ and the second right threshold $ST2_R$) for judging whether to perform the automatic deceleration in right pivot turn of the machine body 2.

According to the above configuration, in a case of left pivot turn, the second rotation speed $RM_{RPM}$ of the right traveling motor 36R is faster than the first rotation speed $LM_{RPM}$ of the left traveling motor 36L, and in right pivot turn, the first rotation speed $LM_{RPM}$ of the left traveling motor 36L is faster than the second rotation speed $RM_{RPM}$ of the right traveling motor 36R. That is, since a rotation speed of the traveling motor opposite to a turn direction is faster, the deceleration thresholds for automatic deceleration (that is, the left threshold and the right threshold) are determined based on a rotation speed of the traveling motor to enable smooth automatic deceleration corresponding to left pivot turn or right pivot turn. In other words, automatic deceleration can be prevented from being performed unintentionally at the time of left pivot turn or right pivot turn, and thus automatic deceleration can be performed only as necessary.

The controller 60 is configured or programmed to determine the left thresholds (that is, the first left threshold $ST1_L$ and the second left threshold $ST2_L$) to be lower as the second rotation speed $RM_{RPM}$ decrease, to determine the left thresholds (that is, the first left threshold $ST1_L$ and the second left threshold $ST2_L$) to be higher as the second rotation speed $RM_{RPM}$ increases, to determine the right thresholds (that is, the first right threshold $ST1_R$ and the second right threshold $ST2_R$) to be lower as the first rotation speed $LM_{RPM}$ decreases, and to determine the right thresholds (that is, the first right threshold $ST1_R$ and the second right threshold $ST2_R$) to be higher as the first rotation speed $LM_{RPM}$ increases. According to this configuration, automatic deceleration corresponding to left pivot turn or right pivot turn can be performed smoothly. In other words, it is possible to suppress unintentional automatic deceleration at the time of left pivot turn or right pivot turn, and thus automatic deceleration can be performed only as necessary.

The working machine 1 includes the first circulation fluid line 57h connecting the left traveling pump 53L to the left traveling motor 36L, the second circulation fluid line 57i connecting the right traveling pump 53R to the right traveling motor 36R, the first pressure detector 80a located on the portion of the first circulation fluid line 57h connected to the first port P11 of the left traveling motor 36L and configured to detect the first traveling pressure V1 that is the pressure of operation fluid flowing in the portion of the first circulation fluid line 57h connected to the first port P11 during rotation of the left traveling motor 36L, the second pressure detector 80b provided on the portion of the first circulation fluid line 57h connected to the second port P12 of the left traveling motor 36L and configured to detect the second traveling pressure V2 that is the pressure of operation fluid flowing in the portion of the first circulation fluid line 57h connected to the second port P12 during rotation of the left traveling motor 36L, the third pressure detector 80c provided on the portion of the second circulation fluid line 57i connected to the third port P13 of the right traveling motor 36R and configured to detect the third traveling pressure V3 that is the pressure of operation fluid flowing in the portion of the second circulation fluid line 57i connected to the third port P13 during rotation of the right traveling motor 36R, and the fourth pressure detector 80d provided on the portion of the second circulation fluid line 57i connected to the fourth port P14 of the right traveling motor 36R and configured to detect the fourth traveling pressure V4 that is the pressure of operation fluid flowing in the portion of the second circulation fluid line 57*i* connected to the fourth port P14 during rotation of the right traveling motor 36R.

In the above-described configuration, the controller 60 is configured or programmed to perform the automatic deceleration during left pivot turn of the machine body 2 when the third traveling pressure V3 or the fourth traveling pressure V4 is equal to or higher than the left threshold (that is, the first left threshold $ST1_L$), and to perform the automatic deceleration during right pivot turn of the machine body 2 when the first traveling pressure V1 or the second traveling pressure V2 is equal to or higher than the right threshold (that is, the first right threshold $ST1_R$). According to this configuration, in left pivot turn of the machine body 2, automatic deceleration can be performed when the traveling pressures (that is, the third traveling pressure V3 and the fourth traveling pressure V4) corresponding to the right traveling motor 36R are equal to or higher than the left threshold (that is, the first left threshold $ST1_L$). In addition, in right pivot turn of the machine body 2, automatic deceleration can be performed when the traveling pressures (that is, the first traveling pressure V1 and the second traveling pressure V2) corresponding to the left traveling motor 36L are equal to or higher than the left threshold (that is, the first right threshold $ST1_R$).

As another example, the controller 60 is configured or programmed to perform the automatic deceleration during left pivot turn of the machine body 2 when the third differential pressure $\Delta V3$ which is obtained by subtracting the fourth traveling pressure V4 from the third traveling pressure V3 or the fourth differential pressure $\Delta V4$ which is obtained by subtracting the third traveling pressure V3 from the fourth traveling pressure V4 is equal to or higher than the left threshold (that is, the second left threshold $ST2_L$), and performs the automatic deceleration during right pivot turn of the machine body 2 when the first differential pressure $\Delta V1$ which is obtained by subtracting the second traveling pressure V2 from the first traveling pressure V1 or the second differential pressure $\Delta V2$ which is obtained by subtracting the first traveling pressure V1 from the second traveling pressure V2 is equal to or higher than the right threshold (that is, the second right threshold $ST2_R$). According to this configuration, in left pivot turn of the machine body 2, automatic deceleration can be performed when the effective traveling pressures (that is, the third differential pressure $\Delta V3$ and the fourth differential pressure $\Delta V4$) corresponding to the right traveling motor 36R are equal to or higher than the left threshold (that is, the second left threshold $ST2_L$). In addition, in right pivot turn of the machine body 2, automatic deceleration can be performed when the effective traveling pressures (that is, the first differential pressure $\Delta V1$ and the second differential pressure $\Delta V2$) corresponding to the left traveling motor 36L is equal to or higher than the left threshold (that is, the second right threshold $ST2_R$).

The controller 60 is configured or programmed to change the left thresholds (that is, the first left threshold $ST1_L$ and the second left threshold $ST2_L$) and the right thresholds (that is, the first right threshold $ST1_R$ and the second right threshold $ST2_R$) according to variation in a revolving speed of the prime mover 32. According to this configuration, the left threshold and the right threshold can be changed according to a revolving speed of the prime mover 32, which varies depending on a load of the prime mover, so that automatic deceleration can be performed according to the load.

The controller 60 is configured or programmed to determine the left thresholds (that is, the first left threshold $ST1_L$ and the second left threshold $ST2_L$) for the left pivot turn of the machine body 2 when the traveling operation device 54 is operated in a direction corresponding to the left pivot turn, and to determine the right thresholds (that is, the first right threshold $ST1_R$ and the second right threshold $ST2_R$) for the right pivot turn of the machine body 2 when the traveling operation device 54 is operated in a direction corresponding to the right pivot turn. According to this configuration, the left threshold and the right threshold can be determined according to the rotation speeds $LM_{RPM}$ and $RM_{RPM}$ of the traveling motors 36L and 36R immediately before pivot turn of the machine body 2, and thereby automatic deceleration is performed.

The controller 60 is configured or programmed to determine the spin-turn thresholds (that is, the first spin-turn threshold $ST1_P$ and the second spin-turn threshold $ST2_P$) for judging whether to perform automatic deceleration during spin-turn of the machine body 2, according to faster one of the first rotation speed $LM_{RP}M$ and the second rotation speed $RM_{RP}M$. According to this configuration, when a rotation difference occurs between the rotation speeds $LM_{RPM}$ and $RM_{RPM}$ of the traveling motors 36L and 36R in spin turn, automatic deceleration can be performed as necessary.

The controller 60 is configured or programmed to determine the spin-turn threshold for judging whether to perform automatic deceleration during spin-turn of the machine body 2 so that the spin turn threshold is lower than the left thresholds (that is, the first left threshold $ST1_L$ and the second left threshold $ST2_L$) and the right thresholds (that is, the first right threshold $ST1_R$ and the second right threshold $ST2_R$). According to this configuration, automatic deceleration can be smoothly performed as necessary in spin turn of the machine body 2.

The controller 60 is configured or programmed to perform the automatic deceleration during the spin turn of the machine body 2 when any one of the first traveling pressure V1, the second traveling pressure V2, the third traveling pressure V3, and the fourth traveling pressure V4 is equal to or higher than the spin-turn threshold (that is, the first spin-turn threshold $ST1_P$). According to this configuration, it is possible to judge whether to perform automatic deceleration at the time of spin turn according to the first traveling pressure V1, the second traveling pressure V2, the third traveling pressure V3, and the fourth traveling pressure V4, and automatic deceleration can be performed only when any one of the first traveling pressure V1, the second traveling pressure V2, the third traveling pressure V3, and the fourth traveling pressure V4 is equal to or higher than the spin-turn threshold (that is, first spin-turn threshold $ST1_P$).

In a case of spin turn of the machine body 2, the controller 60 is configured or programmed to perform the automatic deceleration when the traveling operation device 54 is operated in a direction corresponding to the spin turn under a state where any one of the first traveling pressure V1, the second traveling pressure V2, the third traveling pressure V3, and the fourth traveling pressure V4 is equal to or higher than the spin-turn threshold. According to this configuration, automatic deceleration can be performed according to the traveling pressures V1 to V4 immediately before spin turn of the machine body 2.

The controller 60 is configured or programmed to perform the automatic deceleration during spin turn of the machine body 2 when any one of the first differential pressure $\Delta V1$ obtained by subtracting the second traveling pressure V2 from the first traveling pressure V1, the second differential pressure $\Delta V2$ obtained by subtracting the first traveling pressure V1 from the second traveling pressure V2, the third differential pressure ΔV3 obtained by subtracting the fourth traveling pressure V4 from the third traveling pressure V3, and the fourth differential pressure ΔV4 obtained by subtracting the third traveling pressure V3 from the fourth traveling pressure V4 is equal to or higher than the spin-turn threshold (that is, the second spin-turn threshold $ST2_P$). According to this configuration, it is possible to judge whether to perform automatic deceleration in spin turn according to the first differential pressure ΔV1, second differential pressure ΔV2, third differential pressure ΔV3, and fourth differential pressure ΔV4, and it is possible to perform automatic deceleration only when one of the first differential pressure ΔV1, second differential pressure ΔV2, third differential pressure ΔV3, and fourth differential pressure ΔV4 is equal to or higher than the spin-turn threshold (that is, the second spin-turn threshold $ST2_P$).

The controller 60 is configured or programmed to determine the straight-traveling thresholds (that is, the first straight-traveling threshold $SF1_S$ and the second straight-traveling threshold $SF2_S$) for determining whether to perform automatic deceleration in straight traveling of the machine body 2, based on the rotation difference ΔMP between the first rotation speed $LM_{RPM}$ and the second rotation speed $RM_{RPM}$ or the rotation-ratio difference ΔDP. For example, when the machine body 2 shifts from a state of pivot turn to a state of straight traveling, there will be a difference between the first rotation speed $LM_{RPM}$ of the left traveling motor 36L and the second rotation speed $RM_{RPM}$ of the right traveling motor 36R. In such a case, a traveling speed of the machine body 2 can be kept by determining the straight traveling thresholds (that is, first straight traveling threshold $SF1_S$ and the second straight traveling threshold $SF2_S$) based on the rotation difference ΔMP between the first rotation speed $LM_{RPM}$ and the second rotation speed $RM_{RPM}$ or rotation-ratio difference ΔDP. That is, when the machine body 2 shifts from a state of pivot turn to a straight of straight traveling, automatic deceleration is not performed, and when straight traveling of the machine body 2 becomes stable, automatic deceleration can be performed as necessary.

The controller 60 is configured or programmed to determine the straight-traveling thresholds (that is, the first straight-traveling threshold $SF1_S$ and the second straight-traveling threshold $SF2_S$) to be higher as the rotation difference ΔMP increases, and determines the straight-traveling thresholds (that is, the first straight-traveling threshold $SF1_S$ and the second straight-traveling threshold $SF2_S$) to be lower as the rotation difference ΔMP decreases. This makes it difficult to perform automatic deceleration when a state of the machine body 2 is close to a state of pivot turn (that is, when the rotation difference ΔMP is large), and makes it easy to perform automatic deceleration when the state is close to a state of straight traveling (that is, when the rotation difference ΔMP is small).

The controller 60 is configured or programmed to determine the straight-traveling thresholds (that is, the first straight-traveling threshold $SF1_S$ and the second straight-traveling threshold $SF2_S$) to be higher as the rotation-ratio difference ΔDP increases, and determines the straight-traveling thresholds (that is, the first straight-traveling threshold $SF1_S$ and the second straight-traveling threshold $SF2_S$) to be lower as the rotation-ratio difference ΔDP decreases. This makes it difficult to perform automatic deceleration when a state of the machine body 2 is close to a state of pivot turn (that is, when the rotation-ratio difference ΔDP is large), and makes it easy to perform automatic deceleration when the state is close to a state of straight traveling (that is, when the rotation-ratio difference ΔDP is small).

The controller 60 is configured or programmed to perform the automatic deceleration during forward straight traveling of the machine body 2 when either the first traveling pressure V1 or the third traveling pressure V3 is the straight-traveling threshold (that is, the first straight-traveling threshold $SF1_S$). According to this configuration, when the machine body 2 travels forward, automatic deceleration can be performed based on the traveling pressure corresponding to the left traveling motor 36L (that is, the first traveling pressure V1) and the traveling pressure corresponding to the right traveling motor 36R (that is, third traveling pressure V3).

The controller 60 is configured or programmed to perform the automatic deceleration during forward straight traveling of the machine body 2 when either the first differential pressure ΔV1 obtained by subtracting the second traveling pressure V2 from the first traveling pressure V1 or the third differential pressure ΔV3 obtained by subtracting the fourth traveling pressure V4 from the third traveling pressure V3 is equal to or higher than the straight-traveling threshold (that is, the second straight-traveling threshold $SF2_S$). According to this configuration, when the machine body 2 travels forward, automatic deceleration can be performed based on the effective differential pressure corresponding to the left traveling motor 36L (that is, the first differential pressure ΔV1) and the effective differential pressure corresponding to the right traveling motor 36R (that is, the third differential pressure ΔV3).

The controller 60 is configured or programmed to determine the straight-traveling thresholds (that is, the first straight-traveling threshold $SF1_S$ and the second straight-traveling threshold $SF2_S$) based on the first rotation speed $LM_{RPM}$ detected by the first rotation detector 68a and the second rotation speed $RM_{RPM}$ detected by the second rotation detector 68b. For example, when a vehicle speed of the machine body 2 is increased from a low speed, or when the machine body 2 is accelerated from a stopping state, the first rotation speed $LM_{RPM}$ of the left traveling motor 36L and the second rotation speed $RM_{RPM}$ of the right traveling motor 36R increase (become higher). In such cases, automatic deceleration can be performed when straight traveling of the machine body 2 becomes stable, while preventing automatic deceleration from being performed.

The controller 60 is configured or programmed to determine the straight-traveling thresholds (that is, the first straight-traveling threshold $SF1_S$ and the second straight-traveling threshold $SF2_S$) to be lower when the first rotation speed $LM_{RPM}$ or the second rotation speed $RM_{RPM}$ is low, and to determine the straight-traveling thresholds (that is, the first straight-traveling threshold $SF1_S$ and the second straight-traveling threshold $SF2_S$) to be higher when the first rotation speed $LM_{RPM}$ or the second rotation speed $RM_{RPM}$ is high. According to this configuration, when a vehicle speed of the machine body 2 is increased from a low speed or when the machine body 2 is accelerated from a stopping state, automatic deceleration is suppressed, while the automatic deceleration can be performed when straight traveling of the machine body 2 becomes stable.

The controller 60 is configured or programmed to perform the automatic deceleration during forward straight traveling of the machine body 2 when a time for which both the first traveling pressure V1 and the third traveling pressure V3 are equal to or higher than the straight-traveling threshold (that is, the first straight-traveling threshold $SF1_S$) is equal to or longer than a first judgment time. This allows automatic deceleration to be performed when a time elapsed when the traveling pressure corresponding to the left traveling motor 36L (that is, the first traveling pressure V1) and the traveling pressure corresponding to the right traveling motor 36R (that is, the third traveling pressure V3) are equal to or higher than the straight traveling threshold (that is, the first straight traveling threshold $SF1_S$) is equal to or longer than the first judgment time in forward traveling of the machine body 2. That is, automatic deceleration can be performed when the first traveling pressure V1 and the third traveling pressure V3 are equal to or higher than the straight traveling threshold (that is, the first straight traveling threshold $SF1_S$) for a certain period of time.

The controller 60 is configured or programmed to determine the first judgment time to be shorter as the first rotation speed $LM_{RPM}$ or the second rotation speed $RM_{RPM}$ increases, and determines the first judgment time to be longer as the first rotation speed $LM_{RPM}$ or the second rotation speed $RM_{RPM}$ decreases. According to this configuration, when the first rotation speed $LM_{RPM}$ or the second rotation speed $RM_{RPM}$ is small and a vehicle speed (that is, a traveling speed) is slow (that is, low), the first judgment time becomes longer, so that automatic deceleration can be performed only when the vehicle speed is slow for a long time. On the other hand, when the first rotation speed $LM_{RPM}$ or the second rotation speed $RM_{RPM}$ is large and the vehicle speed (that is, the traveling speed) is high, automatic deceleration can be performed quickly as necessary.

The controller 60 is configured or programmed to perform the automatic deceleration during forward straight traveling of the machine 2 when a time for which both the first differential pressure ΔV1 obtained by subtracting the second traveling pressure V2 from the first traveling pressure V1 and the third differential pressure ΔV3 obtained by subtracting the fourth traveling pressure V4 from the third traveling pressure V3 is equal to or higher than the straight-traveling threshold (that is, the second straight-traveling threshold $SF2_S$) is equal to or longer than the second judgment time. According to this configuration, when the machine body 2 moves forward, and when a time elapsed when the effective traveling pressure corresponding to the left traveling motor 36L (that is, the first differential pressure ΔV1) and the effective traveling pressure corresponding to the right traveling motor 36R (that is, the differential pressure ΔV3) are equal to or higher than the straight traveling threshold (that is, the second straight traveling threshold $SF2_S$) is equal to or longer than the second judgment time in forward traveling, automatic deceleration can be performed. That is, automatic deceleration can be performed when the effective traveling pressure (that is, the first differential pressure ΔV1) and the effective traveling pressure (that is, the third differential pressure ΔV3) are equal to or higher than the straight traveling threshold (that is, the second straight traveling threshold $SF2_S$) for a certain period of time.

The controller 60 is configured or programmed to determine the second judgment time to be shorter as the first rotation speed $LM_{RPM}$ or the second rotation speed $RM_{RPM}$ increases, and to determine the second judgment time to be longer as the first rotation speed $LM_{RPM}$ or the second rotation speed $RM_{RPM}$ decreases. According to this configuration, when the first rotation speed $LM_{RPM}$ or the second rotation speed $RM_{RPM}$ is small and a vehicle speed (that is, a traveling speed) is slow, the first judgment time becomes longer, so that automatic deceleration can be performed only when the vehicle speed is slow for a long time. On the other hand, when the first rotation speed $LM_{RPM}$ or the second rotation speed $RM_{RPM}$ is large and the vehicle speed (that is, the traveling speed) is fast (that is, high), automatic deceleration can be performed quickly as necessary.

The controller 60 is configured or programmed so that it does not perform the automatic deceleration when the traveling operation member 59 is operated in a direction to make the machine body 2 travel forward and the left traveling motor 36L and the right traveling motor 36R are rotating in a direction corresponding to backward traveling of the machine body 2. According to this configuration, when the traveling operation member 59 is instantaneously operated in a forward-traveling direction from the state in which the machine body 2 is traveling backward, automatic deceleration is not performed, thereby stabilizing the backward traveling of the working machine 1.

The controller 60 is configured or programmed so that it does not perform the automatic deceleration when the first rotation speed $LM_{RPM}$ of the left traveling motor 36L is equal to or higher than a predetermined rotation speed or the second rotation speed $RM_{RPM}$ of the right traveling motor 36R is equal to or higher than the predetermined rotation speed. According to this configuration, workability can be improved by not performing automatic deceleration when the first rotation speed $LM_{RPM}$ and the second rotation speed $RM_{RPM}$ are high.

The controller 60 is configured or programmed so that it does not perform the automatic deceleration when the first rotation speed $LM_{RPM}$ of the left traveling motor 36L is equal to or higher than the first maximum rotation speed or when the second rotation speed $RM_{RPM}$ of the right traveling motor 36R is equal to or higher than the second maximum rotation speed. For example, even when a rotation speed of the left traveling motor 36L exceeds the first maximum rotation speed of the left traveling motor 36L at the first speed or a rotation speed of the right traveling motor 36R exceeds the second maximum rotation speed of the right traveling motor 36R at the first speed in a state where the machine body 2 is climbing a hill at the second speed, automatic deceleration is not performed, thereby allowing the machine body 2 to travel without deteriorating a traveling performance.

In the above-mentioned embodiment, the left traveling motor 36L and the right traveling motor 36R are configured to simultaneously switch their speed stages to the first speed or the second speed, and automatic deceleration is also performed simultaneously to the left traveling motor 36L and the right traveling motor 36R; the automatic deceleration may be performed with at least one of the left traveling motor 36L and the right traveling motor 36R switched to the first speed or to the second speed and with at least one of the left traveling motor 36L and the right traveling motor 36R being at the second speed. Furthermore, the switchable speed stages of the left traveling motor 36L and the right traveling motor 36R may not be limited to two, but be three or more.

The traveling motors 36L and 36R may be axial piston motors or radial piston motors. Regardless of whether the traveling motors 36L and 36R are radial piston motors or radial piston motors, when a pressure of operation fluid supplied to the motors becomes high, rotation speeds of the traveling motors can be switched to the first speed, and when the pressure of operation fluid supplied to the motors becomes low, the rotation speeds of the traveling motors can be switched to the second speed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
a machine body;
a left traveling device located left on the machine body;
a right traveling device located right on the machine body;
a left traveling motor to output a power to the left traveling device;
a right traveling motor to output a power to the right traveling device;
a first rotation detector to detect a first rotation speed that is a rotation speed of the left traveling motor;
a second rotation detector to detect a second rotation speed that is a rotation speed of the right traveling motor;
a left traveling pump to supply operation fluid to the left traveling motor;
a right traveling pump to supply operation fluid to the right traveling motor;
a traveling operation device to operate at least one of the left traveling pump or the right traveling pump; and
a controller configured or programmed to perform automatic deceleration to automatically reduce the first rotation speed and the second rotation speed by shifting a speed stage of each of the left and right traveling motors from a second speed stage to a first speed stage that is lower than the second speed stage, wherein
the controller is configured or programmed to:
not perform the automatic deceleration when the first rotation speed or the second rotation speed is equal to or higher than a predetermined rotation speed; and
perform the automatic deceleration when the first rotation speed and the second rotation speed are less than the predetermined rotation speed.

2. The working machine according to claim 1, further comprising:
a hydraulic pump to deliver pilot fluid; and
traveling fluid lines connected to pressure receiver portions of the left traveling pump and the right traveling pump; wherein
the traveling operation device is configured to be operated to change each of angles of swash plates of the left traveling pump and the right traveling pump, respectively, and to change pilot pressure to be outputted to each of the traveling fluid lines according to operation of the traveling operation device, the pilot pressure being a pressure of the pilot fluid; and
the controller is configured or programmed to judge a behavior of the machine body based on the pilot pressure at each of the traveling fluid lines, and, if determining that the behavior of the machine body is a left pivot turn or a right pivot turn, perform the automatic deceleration.

3. The working machine according to claim 1, further comprising:
a hydraulic pump to deliver pilot fluid; and
traveling fluid lines connected to pressure receiver portions of the left traveling pump and the right traveling pump; wherein
the traveling operation device is configured to be operated to change each of angles of swash plates of the left traveling pump and the right traveling pump, respectively, and to change pilot pressure to be outputted to each of the traveling fluid lines according to operation of the traveling operation device, the pilot pressure being a pressure of the pilot fluid; and
the controller is configured or programmed to judge a behavior of the machine body based on the pilot pressure at each of the traveling fluid lines, and, if determining that the behavior of the machine body is a left spin turn or a right spin turn, perform the automatic deceleration.

4. The working machine according to claim 1, further comprising:
a hydraulic pump to deliver pilot fluid; and
traveling fluid lines connected to pressure receiver portions of the left traveling pump and the right traveling pump; wherein
the traveling operation device includes:
a traveling operation member to be swung; and
operation valves to be actuated according to a manner in which the traveling operation member is swung and change pilot pressure outputted to each of the traveling fluid lines, the pilot pressure being a pressure of the pilot fluid; wherein
the pilot pressure which acts on one or more of the pressure receiver portions of the left traveling pump and the right traveling pump from the respective traveling fluid lines changes, so that one or more of the angles of swash plates of the left traveling pump and the right traveling pump are changed and one or more of rotation directions and/or one or more of rotation speeds of the left traveling motor and the right traveling motor change.

5. The working machine according to claim 4, wherein
the traveling operation device includes high-pressure selector valves each connected to a corresponding one of the traveling fluid lines and each connected to two of the operation valves; and
each of the high-pressure selector valves is configured to output, to the corresponding one of the traveling fluid lines, a higher one of pilot pressures outputted from the two of the operation valves.

6. The working machine according to claim 1, wherein
the controller is configured or programmed to:
not perform the automatic deceleration when the traveling operation device is operated in a direction to make the machine body to travel forward and the left traveling motor and the right traveling motor are rotating in a direction corresponding to backward traveling of the machine body; and
perform the automatic deceleration when the traveling operation device is operated in a direction to make the machine body to travel forward and the left traveling motor and the right traveling motor are rotating in a direction corresponding to forward traveling of the machine body.

7. The working machine according to claim 1, further comprising:
a first circulation fluid line connecting the left traveling pump to the left traveling motor;
a second circulation fluid line connecting the right traveling pump to the right traveling motor;
a first pressure detector provided on a portion of the first circulation fluid line connected to a first port of the left traveling motor and configured to detect a first traveling pressure that is a pressure of operation fluid flowing in the portion of the first circulation fluid line connected to the first port during rotation of the left traveling motor;
a second pressure detector provided on a portion of the first circulation fluid line connected to a second port of the left traveling motor and configured to detect a second traveling pressure that is a pressure of operation fluid flowing in the portion of the first circulation fluid line connected to the second port during rotation of the left traveling motor;

a third pressure detector provided on a portion of the second circulation fluid line connected to a third port of the right traveling motor and configured to detect a third traveling pressure that is a pressure of operation fluid flowing in the portion of the second circulation fluid line connected to the third port during rotation of the right traveling motor; and a fourth pressure detector provided on a portion of the second circulation fluid line connected to a fourth port of the right traveling motor and configured to detect a fourth traveling pressure that is a pressure of operation fluid flowing in the portion of the second circulation fluid line connected to the fourth port during rotation of the right traveling motor, wherein the controller is configured or programmed to determine whether or not to perform the automatic deceleration based on (i) at least one of the first traveling pressure, the second traveling pressure, the third traveling pressure, or the fourth traveling pressure and (ii) at least one predetermined threshold.

8. The working machine according to claim 7, wherein the controller is configured or programmed to increase the at least one predetermined threshold as the first rotation speed or the second rotation speed increases.

* * * * *